US008662679B2

(12) United States Patent
Otani et al.

(10) Patent No.: US 8,662,679 B2
(45) Date of Patent: Mar. 4, 2014

(54) PROJECTION SYSTEM AND PROJECTOR INCLUDING THE SAME

(75) Inventors: Makoto Otani, Matsumoto (JP); Eiji Morikuni, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 95 days.

(21) Appl. No.: 13/493,572

(22) Filed: Jun. 11, 2012

(65) Prior Publication Data

US 2012/0327372 A1    Dec. 27, 2012

(30) Foreign Application Priority Data

Jun. 22, 2011  (JP) ................... 2011-138234

(51) Int. Cl.
  *G03B 21/14*  (2006.01)
  *G03B 3/00*  (2006.01)
  *G02B 9/00*  (2006.01)
  *G02B 9/08*  (2006.01)

(52) U.S. Cl.
  USPC ............. 353/97; 353/100; 353/101; 359/739; 359/740

(58) Field of Classification Search
  USPC ................ 353/31, 88–89, 91–92, 94, 97, 353/100–101; 359/648–651, 676–677, 359/694–698, 738–740
  See application file for complete search history.

(56) References Cited

U.S. PATENT DOCUMENTS

| 5,668,666 | A | * | 9/1997 | Suzuki | ............................ | 359/674 |
| 5,671,993 | A | * | 9/1997 | Shikama | ......................... | 353/77 |
| 5,905,597 | A | * | 5/1999 | Mizouchi et al. | ............. | 359/671 |
| 6,995,920 | B2 | * | 2/2006 | Nurishi | .......................... | 359/668 |
| 7,095,563 | B2 |   | 8/2006 | Nurishi | | |
| 7,113,344 | B2 |   | 9/2006 | Nurishi et al. | | |
| 7,612,946 | B2 | * | 11/2009 | Kweon et al. | .................. | 359/648 |
| 2005/0225876 | A1 | * | 10/2005 | Nurishi | .......................... | 359/716 |
| 2013/0010370 | A1 | * | 1/2013 | Otani et al. | .................... | 359/668 |
| 2013/0010371 | A1 | * | 1/2013 | Otani et al. | .................... | 359/668 |
| 2013/0027676 | A1 | * | 1/2013 | Otani et al. | ...................... | 353/97 |
| 2013/0107229 | A1 | * | 5/2013 | Otani et al. | ...................... | 353/70 |

FOREIGN PATENT DOCUMENTS

JP    A-2005-221597    8/2005
JP    A-2005-300928    10/2005

* cited by examiner

*Primary Examiner* — Tony Ko
*Assistant Examiner* — Jori S Reilly-Diakun
(74) *Attorney, Agent, or Firm* — Oliff PLC

(57) ABSTRACT

An object-side lens group has different power factors between the vertical and horizontal directions of a liquid crystal panel, and a projection system as a whole therefore has different focal lengths between the vertical and horizontal directions and hence different magnification factors between the vertical and horizontal directions, whereby the aspect ratio of an image on the liquid crystal panel can be set at a value different from the aspect ratio of an image projected on a screen. That is, the projection system can convert the aspect ratio, which is the ratio of the width to the height of an image. When the distance between a diaphragm and an extreme end surface of the object-side lens group on the screen side satisfies a predetermined condition, at least a certain degree of telecentricity can be provided both in the vertical and horizontal directions.

20 Claims, 16 Drawing Sheets

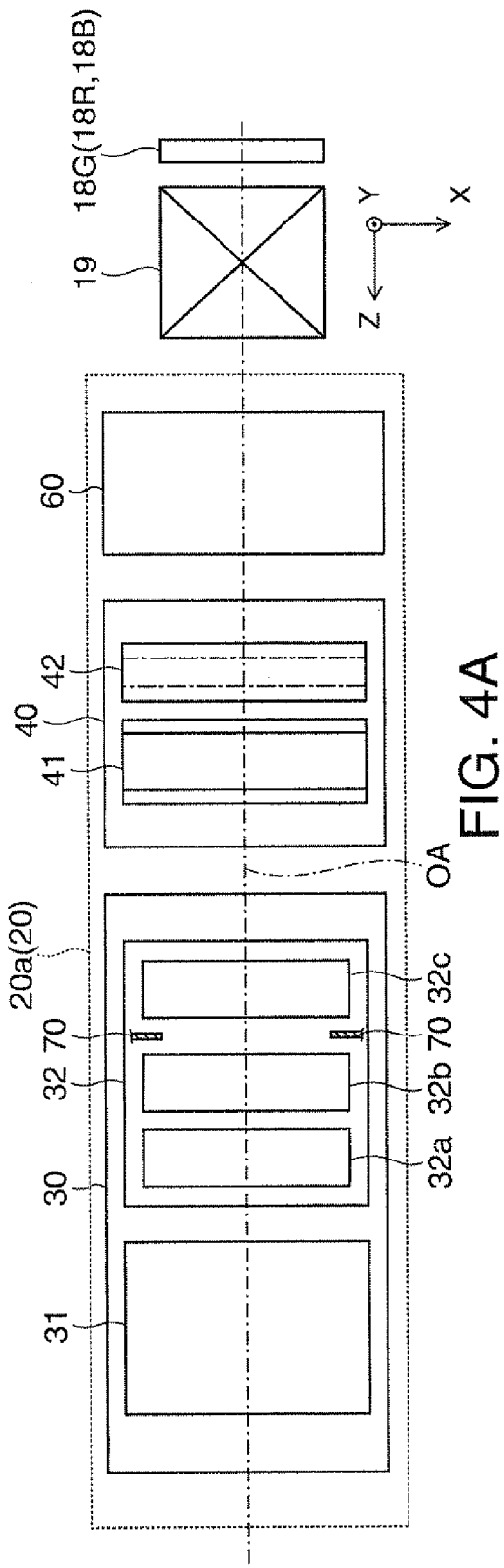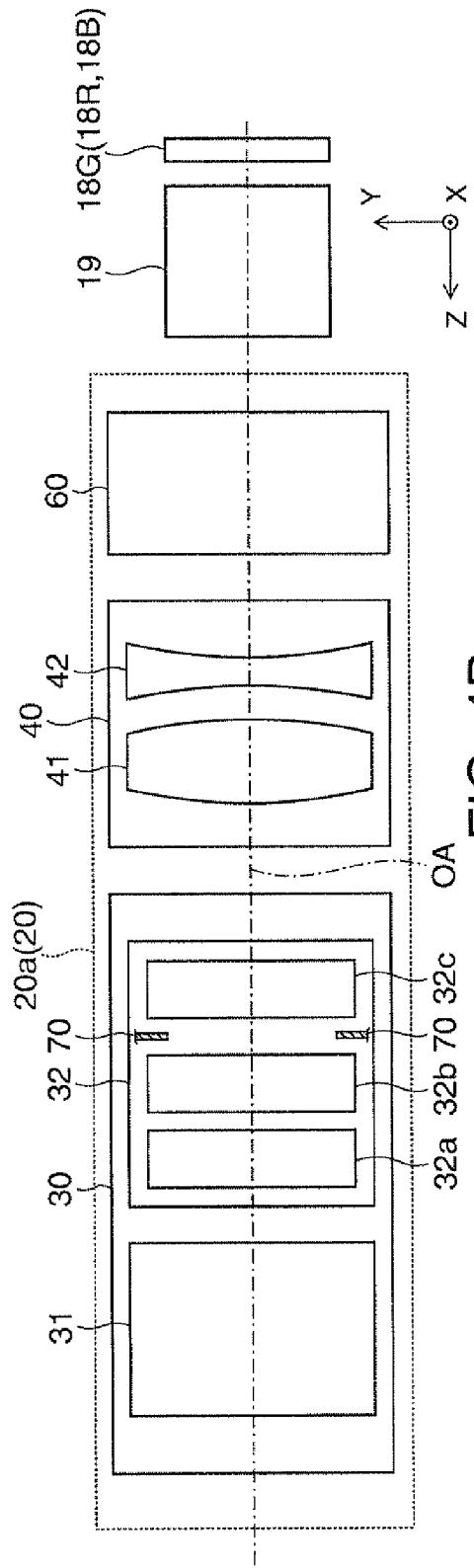

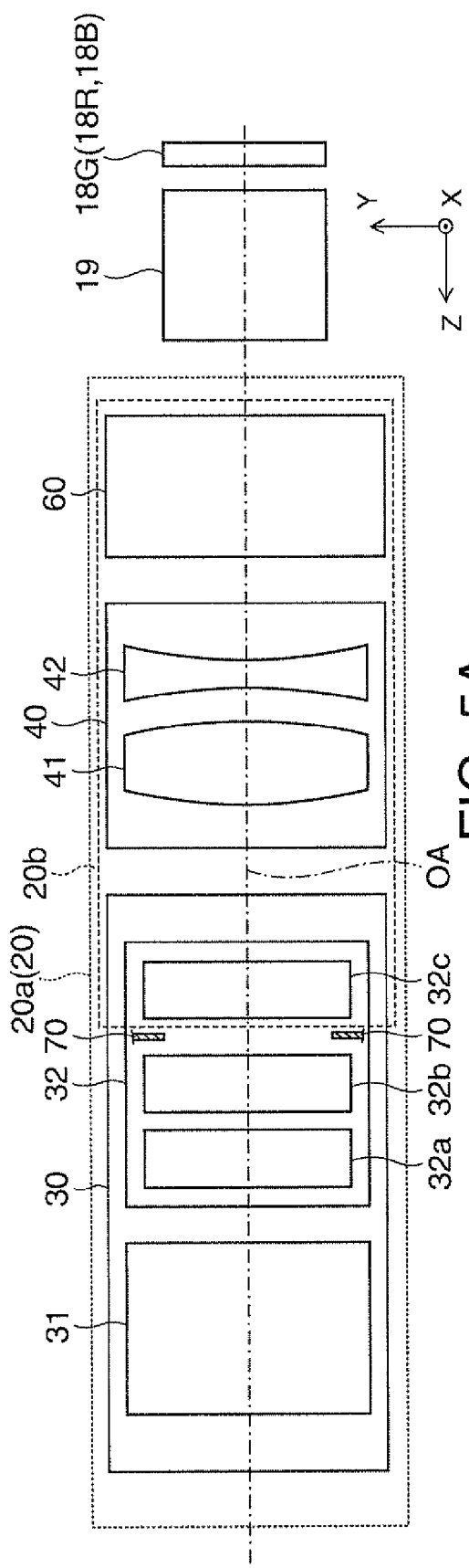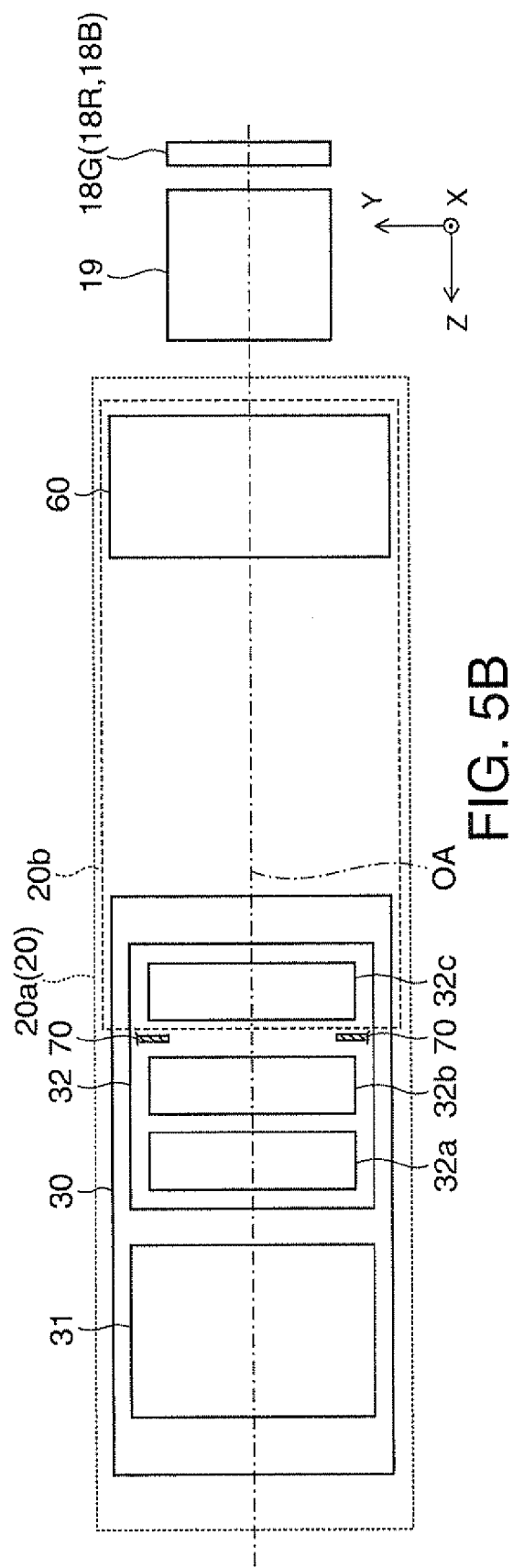

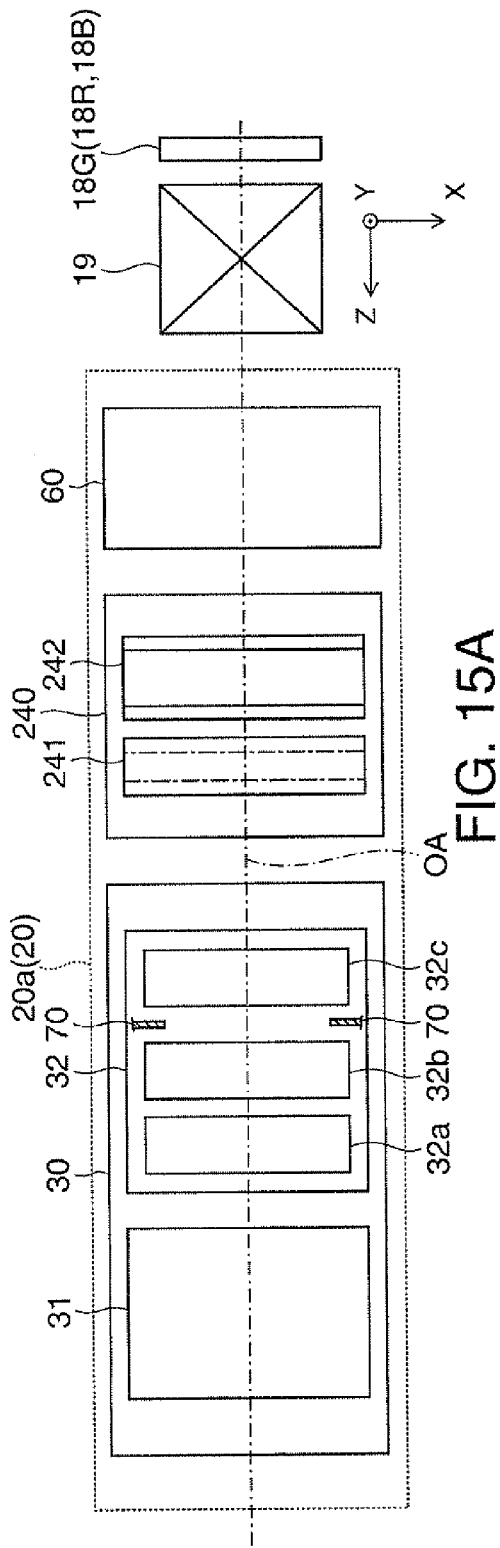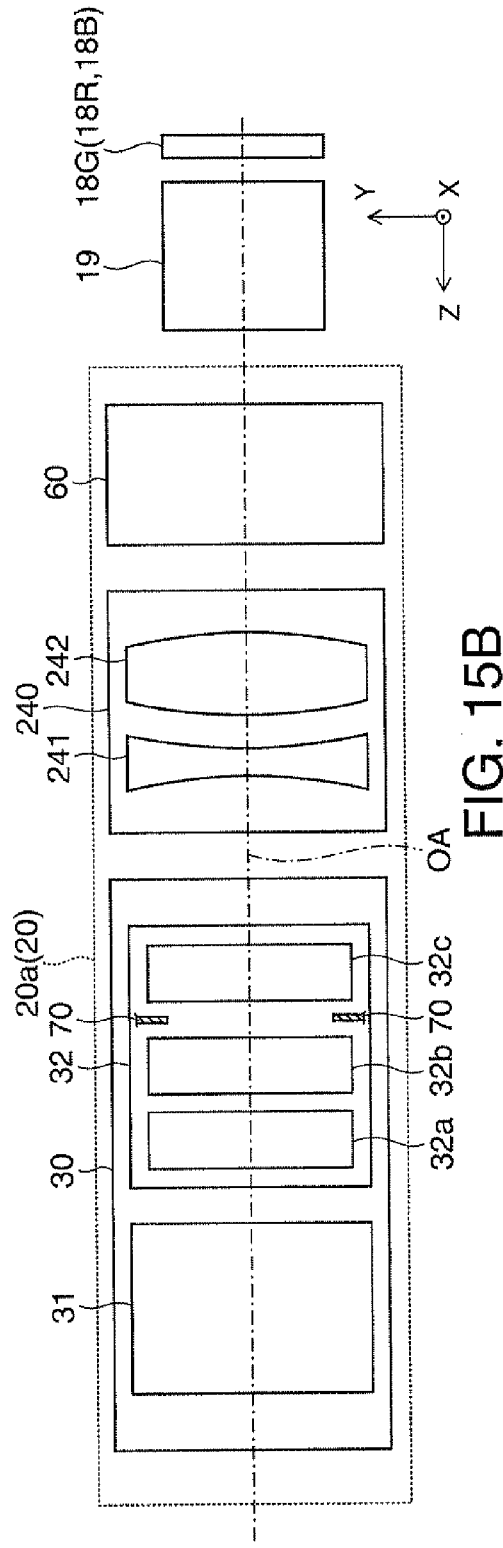

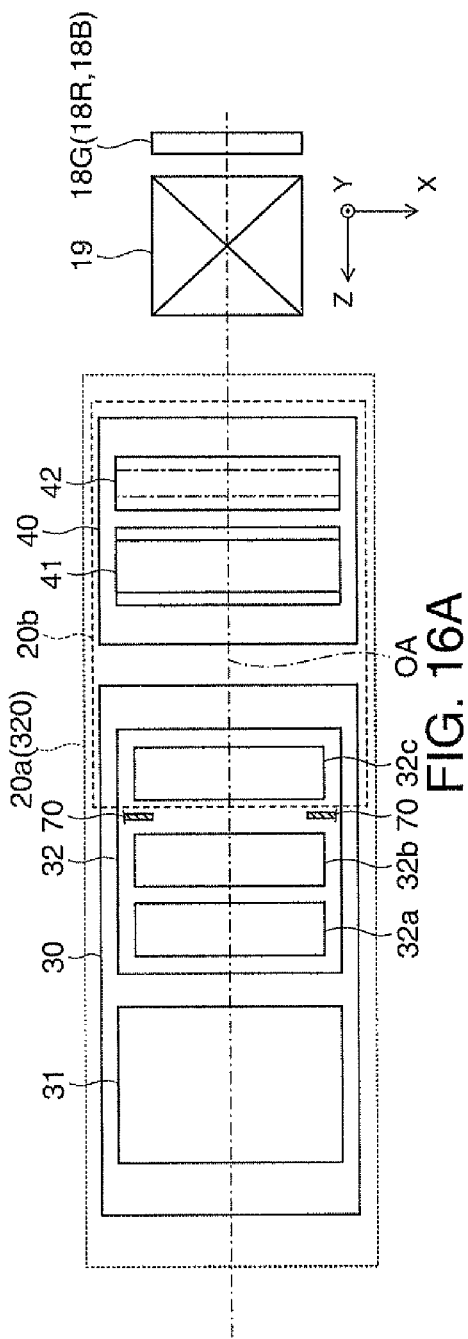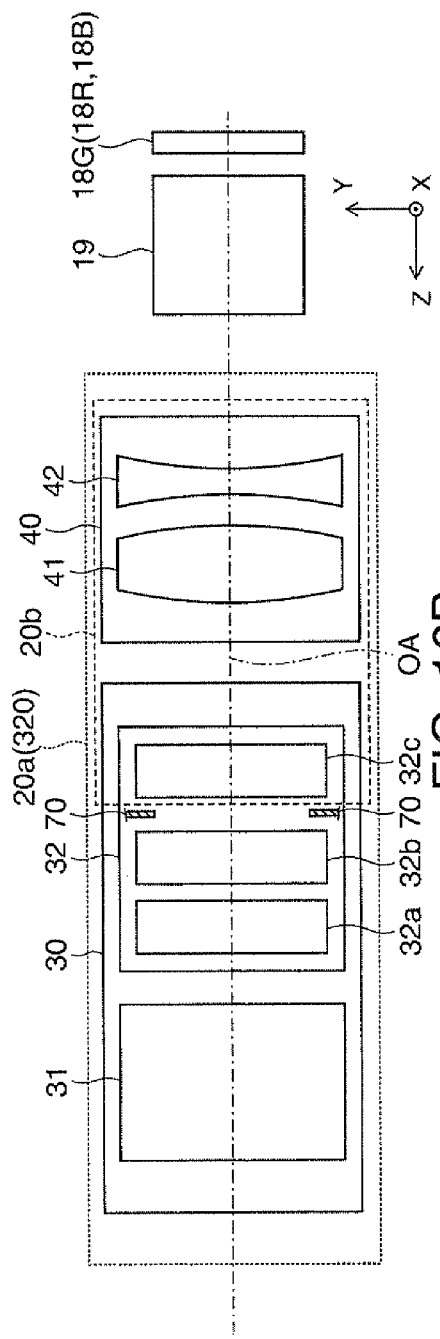

PROJECTION SYSTEM AND PROJECTOR INCLUDING THE SAME

BACKGROUND

1. Technical Field

The present invention relates to a projection system capable of changing the aspect ratio of a projected image and a projector including the projection system.

2. Related Art

As an aspect ratio converter used with a projection system of a projector, there is a front-mounted converter so disposed in front of a built-in projection system, that is, on the image side thereof that the converter is retrearably disposed.

A converter of this type is, however, provided as an external optical unit independent of a projector body, increases the size of the projector, and complicates adjustment of the entire projection system including the converter or greatly degrades a projected image.

There is another aspect ratio converter used with an image-taking system of a camera or any other similar apparatus instead of a projection system of a projector, that is, a rear-mounted relay system so disposed on the image side of an image formation system that the converter is removable from the image-taking system (see JP-A-2005-221597 and JP-A-2005-300928). The relay system is formed of a first group, a second group, and a third group, and the second group, which is the central group, is an anamorphic converter and can be inserted to and removed from the space between the first and third groups.

The relay system or the anamorphic converter disclosed in JP-A-2005-221597 or other patent documents, which is designed to be used with an image-taking system, can also be used with a projection system without any modifications but under a variety of restrictions.

A rear-mounted relay system, such as the one described above, is not designed to provide exact telecentricity. In a relay system of this type, telecentricity in a horizontal cross-sectional plane (X cross-sectional plane) and telecentricity in a vertical cross-sectional plane (Y cross sectional plane) are not satisfied at the same time in principle, which means that providing exact telecentricity in one of the X and Y cross-sectional planes greatly degrades telecentricity in the other cross-sectional plane, resulting in decrease in light usage efficiency or dependence thereof on direction.

When the image-taking system described in JP-A-2005-221597, which is essentially used with an interchangeable lens, is used without the rear-mounted relay system, an image formation system is directly fixed to an imaging unit and used alone. The rear-mounted relay system therefore needs to be long to maintain the performance of the image formation system. On the other hand, since no interchangeable lens is typically used with a projection system, a converter used with a projection system does not need to have a function as a general-purpose relay system or a general-purpose converter that allows a variety of interchangeable lenses to be mounted.

SUMMARY

An advantage of some aspects of the invention is to provide a projection system that allows light usage efficiency to be increased in a well balanced manner and a projector into which the projection system is incorporated.

An aspect of the invention is directed to a projection system that enlarges and projects an image on a projection surface using different aspect ratios between an image on a light modulator and the image projected on the projection surface. The projection system includes a diaphragm that limits a light flux passing therethrough, and an object-side lens group disposed between the light modulator and the diaphragm has different power factors between vertical and horizontal directions of the light modulator. Assuming that a variable p represents the distance between the diaphragm and an extreme end surface of the object-side lens group on the projection surface side, a variable FFPx represents the distance between the focal point of the object-side lens group on the projection surface side and the extreme end surface of the object-side lens group on the projection surface side in a horizontal cross-sectional plane of the object-side lens group, and a variable FFPy represents the distance between the focal point of the object-side lens group on the projection surface side and the extreme end surface of the object-side lens group on the projection surface side in a vertical cross-sectional plane of the object-side lens group, when FFPx<FFPy, $$FFPx < p < FFPy \qquad (1),$$

whereas when FFPy<FFPx, $$FFPy < p < FFPx \qquad (1)'.$$

According to the projection system described above, since the object-side lens group has different power factors between the vertical and horizontal directions of the light modulator, the entire projection system therefore has different focal lengths in the vertical and horizontal directions and hence different magnification factors in the vertical and horizontal directions, whereby the aspect ratio of an image on the light modulator can be set at a value different from the aspect ratio of an image projected on the projection surface. That is, the projection system can convert the aspect ratio, which is the ratio of the width to the height of an image. Since the distance p between the diaphragm and the extreme end surface of the object-side lens group on the projection surface side satisfies the condition (1) or (1)' described above, at least a certain degree of telecentricity can be provided both in the vertical and horizontal directions. For example, when FFPx<p<FFPy, principal rays in the vertical cross-sectional plane are inclined inward toward the projection surface, and principal rays in the horizontal cross-sectional plane are inclined outward toward the projection surface, but the telecentricity is maintained as a whole. Conversely, when FFPy<p<FFPx, the principal rays in the vertical cross-sectional plane are inclined outward toward the projection surface, and the principal rays in the horizontal cross-sectional plane are inclined inward toward the projection surface, but the telecentricity is maintained as a whole.

According to a specific aspect of the invention, in the projection system described above, when FFPx<FFPy, $$FFPx < p \le (FFPy+FFPx)/2 \qquad (2),$$

whereas when FFPy<FFPx, $$FFPy < p \le (FFPy+FFPx)/2 \qquad (2)'.$$

In this case, the telecentricity in intermediate directions between the horizontal and vertical directions can be relatively increased and directional variation in telecentricity can be reduced. As a result, a bright image that unlikely suffers from unevenness depending on the viewing direction and other factors can be projected.

According to another specific aspect of the invention, the projection system is substantially formed of a first group for enlargement, a second group having different power factors between the vertical and horizontal directions of the light modulator, and a third group having positive power arranged in this order from the projection surface side. In this case, the third group having positive power makes the angle of incidence of light incident on the second group and hence the amount of aberrations produced in the second group small, whereby the image formation performance can be improved. Further, since the third group, which can prevent the light from diverging, allows the aperture diameter of the second group to be reduced, it is expected that lenses that form the second group can be manufactured with high precision, leading to improvement in performance and reduction in cost.

According to another specific aspect of the invention, the projection system is substantially formed of a first group for enlargement and a second group having different power factors between the vertical and horizontal directions of the light modulator arranged in this order from the projection surface side. In general, it is difficult to manufacture a rotationally asymmetric optical element, and it is essential to reduce the size of such an optical element for precision manufacturing. In the projection system described above, the amount of divergence of light rays is small and the size of each lens is small accordingly in the vicinity of the light modulator, whereby it is expected that the lenses can be manufactured with high precision, leading to improvement in performance and reduction in cost.

According to another specific aspect of the invention, the second group is retreatably disposed on an optical path, and when the second group is not disposed in the optical path, the aspect ratio of the image on the light modulator agrees with the aspect ratio of the image projected on the projection surface. In this case, the first group is responsible for enlargement, which is a function of a typical projection system, and only the first group can enlarge and project an image on the light modulator on the projection surface with the brightness maintained. Further, when the second group is retreatably disposed on the optical path, a burden on a mechanical mechanism or any other component is small because it is not necessary to move the first group by a long distance. When the second group is the rear-mounted relay system of the related art and the relay system is removed, the first group needs to approach an imaging device approximately by the length corresponding to the relay system, resulting in not only a need for a large-scale mechanical mechanism or any other component to remount and move the first group by a long distance but also a large optical burden on the relay system, which inevitably leads to a long length of the relay system and a large number of constituent lenses thereof comparable to those of the first group. On the other hand, the projection system according to the aspect of the invention does not require the second group to function as a relay lens but allows the total length of the projection system to be shortened and the number of constituent lenses thereof to be reduced. Further, the projection system according to the aspect of the invention differs from the rear-mounted relay system of the related art in that the entire second group, instead of part thereof, is moved forward or backward independently of the first group. advancing or retreating the second group or inserting or removing the second group therefore does not greatly affect, for example, the degree of decentering of the first group. Further, the second group can be independently disposed in a mechanical sense. As a result, the projection system may be assembled only in consideration of assembling precision of the second group as a single unit with the first group, and improvement in assembling workability can therefore be expected. Moreover, since the second group is retreatably disposed on the optical path within a range close to the light modulator, a light ray corresponding to each image height travels along a path at a height relatively close to the image height throughout the second group even when the second group is inserted in the optical path, whereby the light rays can be readily controlled. The amount of aberrations produced when the second group is retreatably disposed on the optical path can therefore be reduced, and the image formation performance will not be degraded when the second group is disposed on the optical path. That is, the second group can be compact and the amount of aberrations can be reduced by disposing the second group, which is retreatable disposed on the optical path, in a position close to the light modulator.

According to another specific aspect of the invention, the first group is a magnification changing optical system, and the diaphragm is moved along an optical axis in response to magnification changing operation of the magnification changing optical system. According to the configuration described above, even when the first group, which is a magnification changing optical system, changes the projection magnification, variation in telecentricity is reduced and light usage efficiency can be increased in a well balanced manner.

According to another specific aspect of the invention, part or the entire of the second group is each a cylindrical lens, an anamorphic lens (toric or toroidal lens), or a free-form surface lens. It is assumed that a cylindrical lens and an anamorphic lens used herein may have an aspheric optical surface.

According to another specific aspect of the invention, the second group includes at least one rotationally symmetric lens and at least one rotationally asymmetric lens. The remaining amount of aberrations that has not been suppressed by the first group, which is an enlarging optical system, particularly astigmatism, can be readily suppressed by the second group close to the light modulator.

According to another specific aspect of the invention, the second group includes a first optical element group having positive power and a second optical element group having negative power arranged in this order from the projection surface side, the positive and negative power present in the vertical cross-sectional plane of the light modulator. In this case, an image projected on the projection surface can be compressed or shortened in the vertical direction. When the projection surface has a fixed horizontal dimension, the aspect ratio can be changed with the projection distance unchanged.

According to another specific aspect of the invention, the second group includes a first optical element group having negative power and a second optical element group having positive power arranged in this order from the projection surface side, the positive and negative power present in the horizontal cross-sectional plane of the light modulator. In this case, an image projected on the projection surface can be expanded or enlarged in the horizontal direction. When the projection surface has a fixed vertical dimension, the aspect ratio can be changed with the projection distance unchanged.

According to another specific aspect of the invention, the light modulator and the projection system are so disposed that a normal to the light modulator that passes through the center thereof is parallel to the optical axis of the projection system. In this case, the center of the light modulator does not need to coincide with the optical axis of the projection system. Relatively precise tilt projection in an oblique direction can be performed by shifting the center of the light modulator from the optical axis of the projection system.

According to another specific aspect of the invention, the projection system further includes a shift mechanism that moves the optical axis of the projection system with the optical axis kept parallel to the normal passing through the center of the light modulator. Relatively precise projection in an oblique direction can still be performed by adjusting the amount of shift. Further, when the enlarging optical system has a magnification changing function, changing the magnification of the projection system during oblique tilt projection causes the absolute amount of shift to increase or decrease, which is corrected by using the shift mechanism. An image can thus be projected within the projection surface.

According to another specific aspect of the invention, a light combining prism is disposed on the side of the object-side lens group that faces the light modulator. In this case, a plurality of color images formed on a plurality of light modulators can be combined and projected.

According to another specific aspect of the invention, among light fluxes traveling from the light modulator to an extreme end surface of the object-side lens group on the light modulator side, a principal ray of a light flux corresponding to the greatest viewing angle is not parallel to the optical axis but is inclined thereto. In this case, the telecentricity in the vertical or horizontal direction will not be greatly degraded by slightly inclining the principal ray at the greatest viewing angle in the horizontal direction and the principal ray at the greatest viewing angle in the vertical direction with respect to the optical axis. Satisfactory telecentricity can thus be maintained in both the vertical and horizontal directions, and the image quality as a whole can be maintained at a high level.

Another aspect of the invention is directed to a projector including the projection system described above and a light modulator. The projector can project an image having an aspect ratio different from the aspect ratio of an image on the light modulator on a projection surface. Further, a special projection system can be used to project a bright image that unlikely suffers from unevenness depending on the viewing direction and other factors.

BRIEF DESCRIPTION OF THE DRAWINGS

The invention will be described with reference to the accompanying drawings, wherein like numbers reference like elements.

FIG. 4A shows the configuration of the projection system in the horizontal cross-sectional plane, and FIG. 4B shows the configuration of the projection system in the vertical cross-sectional plane.

FIG. 5A shows a first operation mode of the projection system, and FIG. 5B shows a second operation mode of the projection system.

FIG. 15A shows the configuration of a projection system of a projector according to a second embodiment in the horizontal cross-sectional plane, and FIG. 15B shows the configuration of the projection system in the vertical cross-sectional plane.

FIG. 16A shows the configuration of a projection system of a projector according to a third embodiment in the horizontal cross-sectional plane, and FIG. 16B shows the configuration of the projection system in the vertical cross-sectional plane.

DESCRIPTION OF EXEMPLARY EMBODIMENTS

A projector and a projection system according to embodiments of the invention will be described below in detail with reference to the drawings.

First Embodiment

Figure 1:
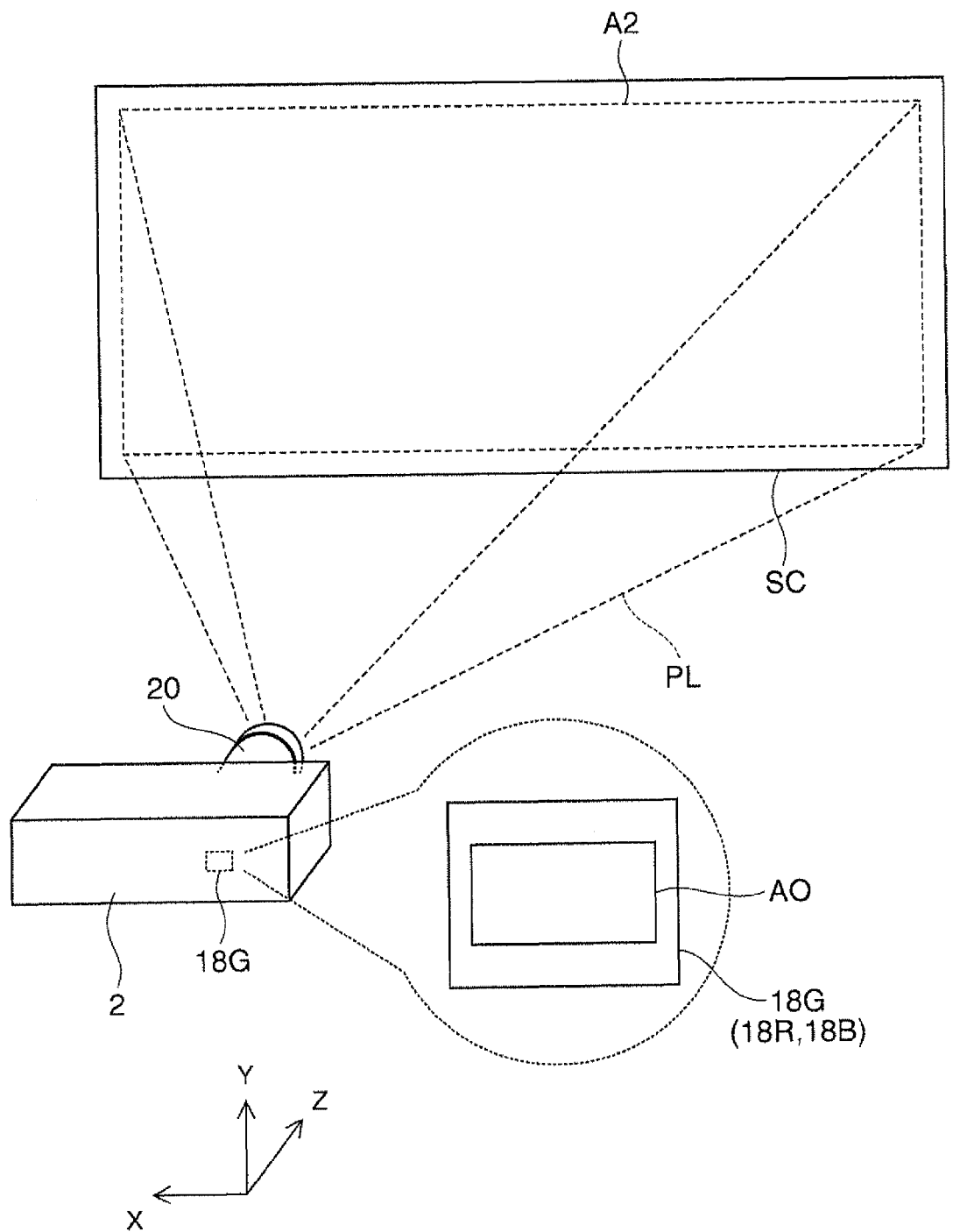
FIG. 1 is a perspective view for describing how a projector according to a first embodiment is used.

A projector 2 according to a first embodiment of the invention forms image light PL in accordance with an image signal and projects the image light PL toward a screen SC or any other projection surface, as shown in FIG. 1. A projection system 20 of the projector 2 enlarges and projects an image on a liquid crystal panel 18G (18R, 18B), which is a light modulator built in the projector 2, on the screen (projection surface) SC. In this process, the aspect ratio AR0 of the image on the liquid crystal panel 18G (18R, 18B) can be set at a value different from the aspect ratio AR2 of the image projected on the screen SC. That is, the aspect ratio AR0 of a display area A0 of the liquid crystal panel 18G can be set at a value different from the aspect ratio AR2 of a display area A2 of the screen SC, or the aspect ratios AR0 and AR2 can be the same value. Specifically, the aspect ratio AR0 of the display area A0 of the liquid crystal panel 18G is, for example, 1.78:1, and the aspect ratio AR2 of the display area A2 of the screen SC is, for example, 1.78:1, 1.85:1, 2.35:1, or 2.4:1.

Figure 2:
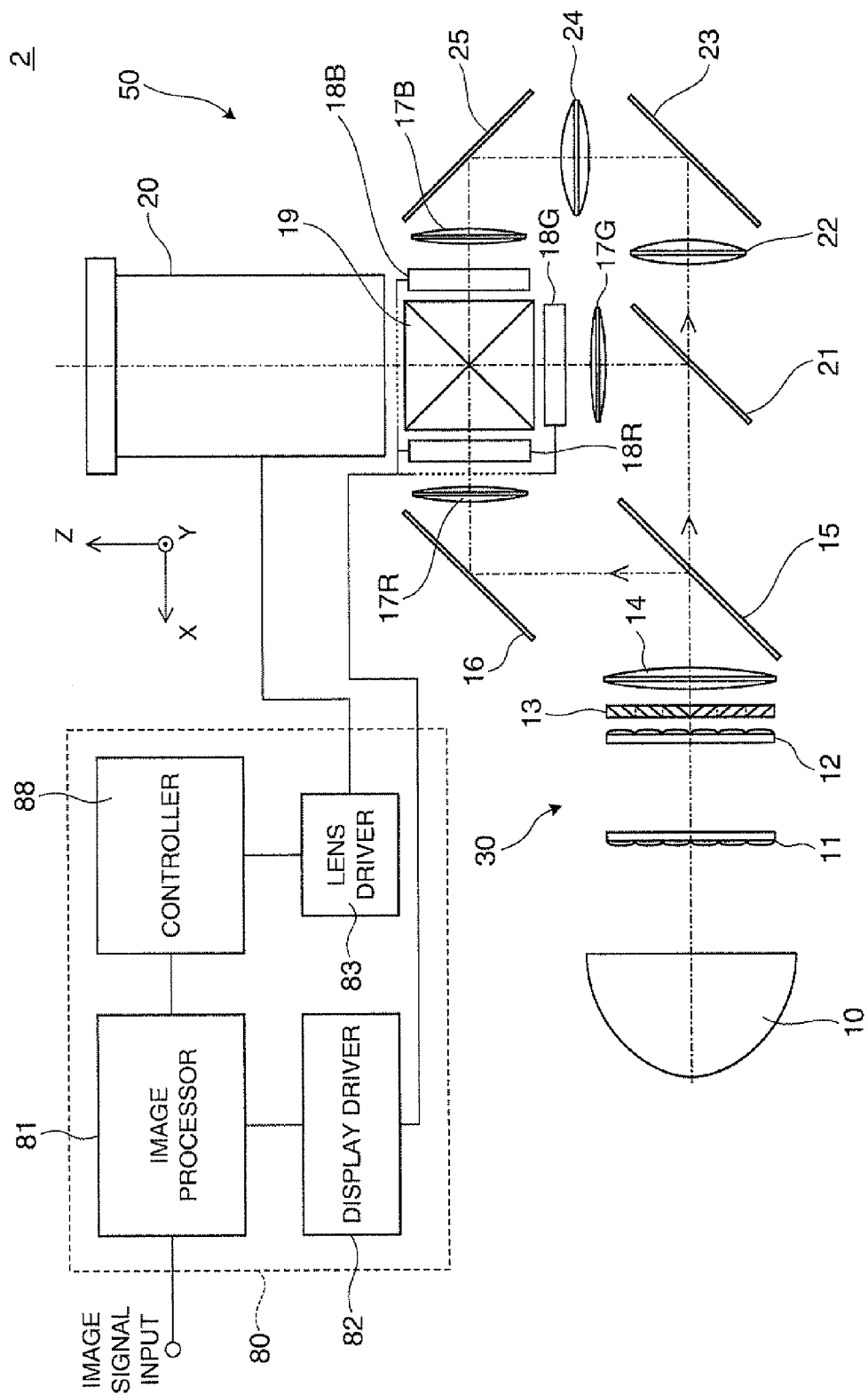
FIG. 2 shows a schematic configuration of the projector shown in FIG. 1.

The projector 2 includes an optical system portion 50 that projects image light and a circuit apparatus 80 that controls the operation of the optical system portion 50, as shown in FIG. 2.

In the optical system portion 50, a light source 10 is, for example, an ultrahigh pressure mercury lamp, which emits light containing R light, G light, and B light. The light source 10 may alternatively be a discharge light source other than an ultrahigh pressure mercury lamp or may be an LED, a laser, or any other solid-state light source. A first optical integration lens 11 and a second optical integration lens 12 each have a plurality of arrayed lens elements. The first optical integration lens 11 divides a light flux from the light source 10 into a plurality of light fluxes. Each of the lens elements of the first optical integration lens 11 focuses the light flux from the light source 10 in the vicinity of the corresponding lens element of the second optical integration lens 12. Each of the lens elements of the second optical integration lens 12 cooperates with a superimposing lens 14 to form an image of the corresponding lens element of the first optical integration lens 11 on the liquid crystal panels 18R, 18G, and 18B. The configuration described above allows the light from the light source 10 to illuminate the entire display areas (display area A0 shown in FIG. 1) of the liquid crystal panels 18R, 18G, and 18B with substantially uniform brightness.

A polarization conversion element 13 converts the light from the second optical integration lens 12 into predetermined linearly polarized light. The superimposing lens 14 superimposes the images of the lens elements of the first optical integration lens 11 on the display areas of the liquid crystal panels 18R, 18G, and 18B via the second optical integration lens 12.

A first dichroic mirror 15 reflects R light and transmits G light and B light incident thereon through the superimposing lens 14. The R light reflected off the first dichroic mirror 15 travels along a reflection mirror 16 and a field lens 17R and impinges on the liquid crystal panel 18R, which is a light modulator. The liquid crystal panel 18R modulates the R light in accordance with an image signal to form an R image.

A second dichroic mirror 21 reflects the G light and transmits the B light having passed through the first dichroic mirror 15. The G light reflected off the second dichroic mirror 21 passes through a field lens 17G and impinges on the liquid crystal panel 18G, which is a light modulator. The liquid crystal panel 18G modulates the G light in accordance with an image signal to form a G image. The B light having passed through the second dichroic mirror 21 travels along relay lenses 22 and 24, reflection mirrors 23 and 25, and a field lens 17B and impinges on the liquid crystal panel 18B, which is a light modulator. The liquid crystal panel 18B modulates the B light in accordance with an image signal to form a B image.

A cross dichroic prism 19, which is a light combining prism, combines the light fluxes modulated by the liquid crystal panels 18R, 18G, and 18B into image light and directs the image light to the projection system 20.

The projection system 20 enlarges and projects the image light PL, into which the light fluxes modulated by the liquid crystal panels 18G, 18R, and 18 5 and have been combined by the cross dichroic prism 19, on the screen SC in FIG. 1. In this process, the projection system 20 can set the aspect ratio AR2 of the image projected on the screen SC at a value different from the aspect ratio AR0 of the image on each of the liquid crystal panels 18G, 18R, and 18 5 or can set the aspect ratio AR2 equal to the aspect ratio AR0.

The circuit apparatus 80 includes an image processor 81 to which a video signal or any other external image signal is inputted, a display driver 82 that drives the liquid crystal panels 18G, 18R, and 18B provided in the optical system portion 50 based on outputs from the image processor 81, a lens driver 83 that operates drive mechanisms (not shown) provided in the projection system 20 to adjust the state of the projection system 20, and a main controller 88 that oversees and controls the operation of the circuit portions 81, 82 and 83 and other components.

The image processor 81 converts an inputted external image signal into color image signals containing grayscales and other parameters. In a first operation mode in which the projection system 20 converts the aspect ratio of an image before projecting the image, the image processor 81 performs in advance image aspect ratio conversion that counters the aspect ratio conversion performed by the projection system 20 so that an image displayed on the screen SC is not expanded or compressed in the horizontal or vertical direction. Specifically, when the projection system 20 expands an image in the horizontal direction in such a way that the aspect ratio is changed, for example, from 1.78:1, for example, to 2.4:1, the image is compressed in advance in the horizontal direction by a factor of 0.742=1.78/2.4 or expanded in the vertical direction by a factor of 1.35=2.4/1.78. On the other hand, in a second operation mode in which the projection system 20 does not convert the aspect ratio of an image before projecting the image, the image processor 81 does not perform the image aspect ratio conversion described above. The image processor 81 can also perform distortion correction, color correction, and a variety of other types of image processing on the external image signal.

The display driver 82 can operate the liquid crystal panels 18G, 18R, and 18B based on the image signals outputted from the image processor 81 to form images corresponding to the image signals or images corresponding to the image signals on which image processing is performed on the liquid crystal panels 18G, 18R, and 18B.

The lens driver 83, which operates under the control of the main controller 88, can move, for example, part of the optical elements that includes a diaphragm and form the projection system 20 along an optical axis OA as appropriate to change the magnification at which the projection system 20 projects an image on the screen SC in FIG. 1. The lens driver 83 can further change the aspect ratio AR2 of an image projected on the screen SC in FIG. 1 by moving another part of the optical elements that form the projection system 20 forward or backward along the optical axis OA, that is, along the optical path. Moreover, the lens driver 83 can change the vertical position of an image projected on the screen SC in FIG. 1 by performing tilt adjustment that moves the entire projection system 20 in the vertical direction, which is perpendicular to the optical axis OA.

The projection system 20 according to the embodiment will be described below with reference FIG. 3. The projection system 20 includes a body portion 20a, which is a combination of a plurality of lenses and other optical elements, and drive mechanisms 61, 62, 63, and 64, which move part of the body portion 20a or the entire body portion 20a to adjust the image formation state of the body portion 20a.

The body portion 20a is formed of a first group 30, a second group 40, a third group 60, and a diaphragm 70 arranged in this order from the side where the screen SC is present.

The first group 30 includes a first lens portion 31 and a second lens portion 32. A subject can be brought into focus through the body portion 20a, for example, by slightly moving at least one of the lenses that form the first lens portion 31 manually or in any other way along the optical axis OA. The second lens portion 32 is formed of a first lens group 32a, a second lens group 32b, a third lens group 32c, and other components as shown in FIG. 4A, and each of the lens groups 32a, 32b, and 32c is formed of at least one lens. The projection magnification provided by the body portion 20a can be changed by using the drive mechanism 61 shown in FIG. 3, which is a zoom drive mechanism, to move the lens groups 32a, 32b, or 32c or other components or at least one of the lenses that form the lens groups and the other components along the optical axis OA.

The second group 40 has different focal lengths between the horizontal and vertical directions (X and Y directions), and the entire projection system 20 including the first group 30 therefore has different focal lengths between the vertical and horizontal directions. That is, the magnification provided by the body portion 20a differs between the vertical and horizontal directions, and an image of the aspect ratio AR2 different from the aspect ratio AR0 of an image displayed on the liquid crystal panel 18G (18R, 18B) can be projected on the screen SC. The second group 40 includes at least one optical element for adjustment having a surface rotationally asymmetric with respect to the optical axis OA. Specifically, the second group 40 is formed of a first optical element group 41 having positive power and a second optical element group 42 having negative power arranged in this order from the side where the screen SC is present, and the positive and negative power is present in the cross-sectional plane in the vertical direction (Y direction) shown in FIG. 4B. The first optical element group 41 and the second optical element group 42 have no power in the cross sectional plane in the horizontal direction (X direction) shown in FIG. 4A.

The second group 40, which is an anamorphic system and a combination of the first optical element group 41 having positive power and the second optical element group 42 having negative power in the horizontal cross-sectional plane, readily provides variable magnification, that is, zooming capability.

Figure 3:
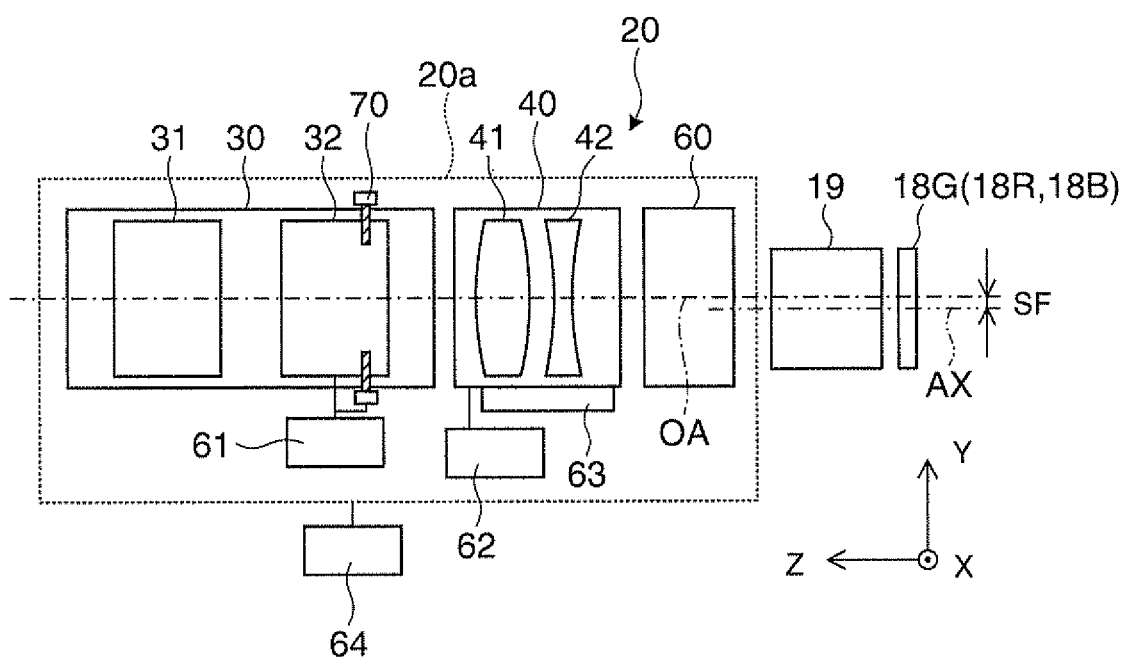
FIG. 3 describes the structure of a projection system of the projector shown in FIG. 1.

The aspect ratio of an image projected on the screen SC can be changed at a desired timing by using the drive mechanism 62 shown in FIG. 3, which is a first anamorphic drive mechanism, to move the second group 40 as a single unit forward or backward along the optical path. Specifically, in the first operation mode, in which the second group 40 is inserted in the optical path as shown in FIG. 5A, an image formed on the liquid crystal panel 18G (18R, 18B) can be compressed in the vertical direction by using a desired aspect ratio (2.4:1, for example) and projected on the screen SC. Alternatively, in the second operation mode, in which the second group 40 is removed from the optical path as shown in FIG. 5B, an image formed on the liquid crystal panel 18G (18R, 18B) can be projected as it is on the screen SC by using the same aspect ratio (1.78:1, for example). The configuration in which an image projected by the second group 40 on the screen SC is compressed in the vertical direction is effective when the screen SC has a fixed horizontal dimension. That is, when the screen SC has a fixed horizontal dimension, only the aspect ratio can be changed with the projection distance and other parameters of the projection system 20 unchanged. The first optical element group 41 and the second optical element group 42, which form the second group 40, can alternatively be moved along the optical axis OA by using the drive mechanism 63, which is a second anamorphic drive mechanism. In this case, the aspect ratio of an image projected on the screen SC can be continuously increased or decreased by adjusting the distance between the first optical element group 41 and the second optical element group 42.

Further, the amount of deviation of an image projected on the screen SC from the optical axis OA can be increased or decreased by using the drive mechanism 64, which is a total system drive mechanism, to move the entire body portion 20a in the direction perpendicular to the optical axis OA so as to adjust the amount of shift of the entire body portion 20a, as shown in FIG. 3. That is, an image can be projected in a position shifted, for example, upward (in +Y direction) from the optical axis OA (tilt projection) by moving the optical axis OA of the body portion 20a with respect to a central axis AX of the liquid crystal panel 18G by an appropriate amount of shift SF with the optical axis OA of the body portion 20a kept parallel to the central axis AX of the liquid crystal panel 18G, whereby the position where an image is projected can be moved upward or downward by adjusting the amount of shift SF. The amount of shift SF, which is the amount of deviation of the optical axis OA of the body portion 20a with respect to the central axis AX of the liquid crystal panel 18G, is not necessarily variable but can, for example, be a nonzero fixed value. The total system drive mechanism 64 can also be used to move the entire body portion 20a along the optical axis OA as appropriate.

The third group 60 includes at least one rotationally symmetric lens having power both in the horizontal and vertical directions. The third group 60, which has positive power, can prevent the light having exited from each of the light modulators from diverging. The angle of light incident on the second group 40 can therefore be small, whereby the amount of aberrations produced in the second group 40 can be small. The third group 60, which can therefore reduce the total amount of aberrations, includes a plurality of lenses as correction optical elements including a lens having positive power and even an aspheric lens as necessary.

The diaphragm 70 is disposed, for example, adjacent to any of the lenses that form the second lens portion 32 in the first group 30. In the example shown in FIG. 4A, the diaphragm 70 is disposed between the second lens group 32b and the third lens group 32c in the second lens portion 32. The diaphragm 70, which blocks part of the light flux passing through the first group 30, that is, the image light, has a function of adjusting the state of the image light. Specifically, the diaphragm 70 sizes and shapes as specified the cross section of the light flux passing through the first group 30 in the position of the diaphragm 70 on the optical axis OA. Restricting the image light having exited from the liquid crystal panel 18G (18R, 18B) as described above allows adjustment of the exiting angle and the direction of each principal ray of the image light. The diaphragm 70 is moved along the optical axis OA in synchronization with the zooming operation of the second lens portion 32 in the first group 30. Moving the diaphragm 70 along the optical axis OA by using the zoom drive mechanism 61 as described above makes the exiting state of the image light having exited from the liquid crystal panel 18G (18R, 18B) appropriate in accordance with the zooming, that is, the projection magnification.

Each of the zoom drive mechanism 61, the first anamorphic drive mechanism 62, the second anamorphic drive mechanism 63, and the total system drive mechanism 64 described above includes a motor, a mechanical transmission mechanism, and a sensor and operates in response to a drive signal from the lens driver 83 shown in FIG. 2. The drive mechanisms 61, 62, 63, and 64 operate not only on an individual basis but also in a combined manner in response to drive signals from the lens driver 83. For example, operating the total system drive mechanism 64 in synchronization with the operation of the zoom drive mechanism 61 prevents an image from shifting at the time of zooming and other disadvantageous phenomena from occurring.

The function of the projection system 20 shown in FIG. 3 and other figures will now be described in detail. In the projection system 20, since the second group 40 is retreatably disposed on the optical path within a range relatively close to the liquid crystal panel 18G (18R, 18B), a light ray corresponding to each image height travels along a path at a height relatively close to the image height throughout the second group, whereby the light rays can be readily controlled. The amount of aberrations produced when the second group 40 is moved forward or backward along the optical path can therefore be reduced. In general, it is difficult to manufacture a rotationally asymmetric optical element, and it is essential to reduce the size of the second group 40 for precision manufacturing. In this regard, when the second group 40 is located closer to the liquid crystal panel 18G (18R, 18B), the amount of divergence of light rays is smaller, and the first optical element group 41 and the second optical element group 42, which are optical elements for adjustment that form the second group 40, can be reduced in size accordingly, whereby it is expected that lenses that form the first and second optical element groups 41, 42 can be manufactured with high precision, leading to improvement in performance of the projection system 20 and reduction in cost. Further, the projection system 20 having a relatively simple configuration, in which the third group 60 is located closest to the liquid crystal panel 18G (18R, 18B), can correct aberrations in an efficient, reasonable manner. The presence of the third group 60 allows further significant improvement in performance as follows: Specifically, the third group 60 can prevent the light flux in the second group 40 from diverging and the diameter of the second group 40 from increasing. Further, when the anamorphic second group is designed to be a substantially afocal system, the requirement in positional precision of the lenses that form the second group 40 can be lowered and sufficient positional precision can be provided.

Figure 6A:
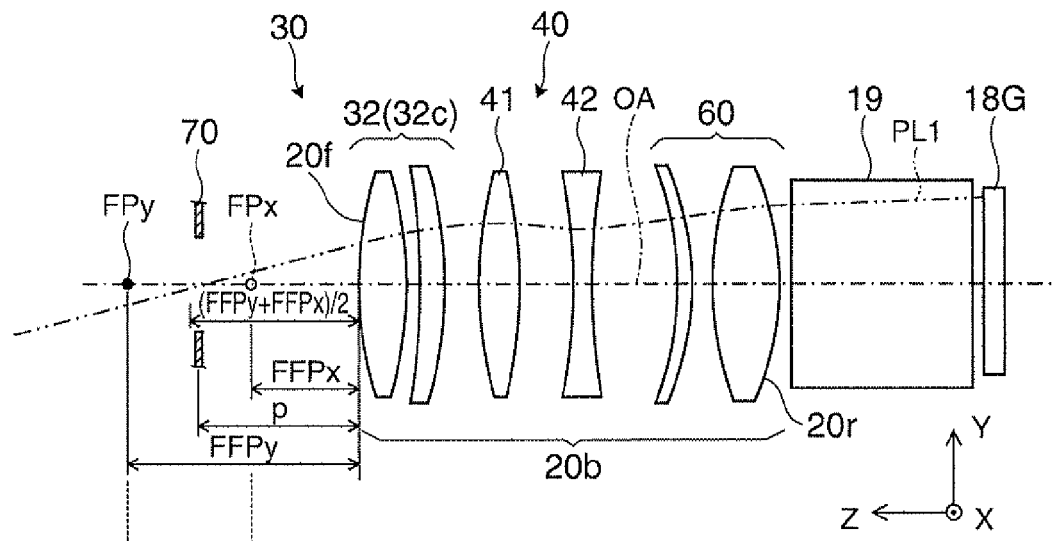
FIGS. 6A and 6B describe the position of a diaphragm in the vertical and horizontal cross-sectional planes.
Figure 6B:
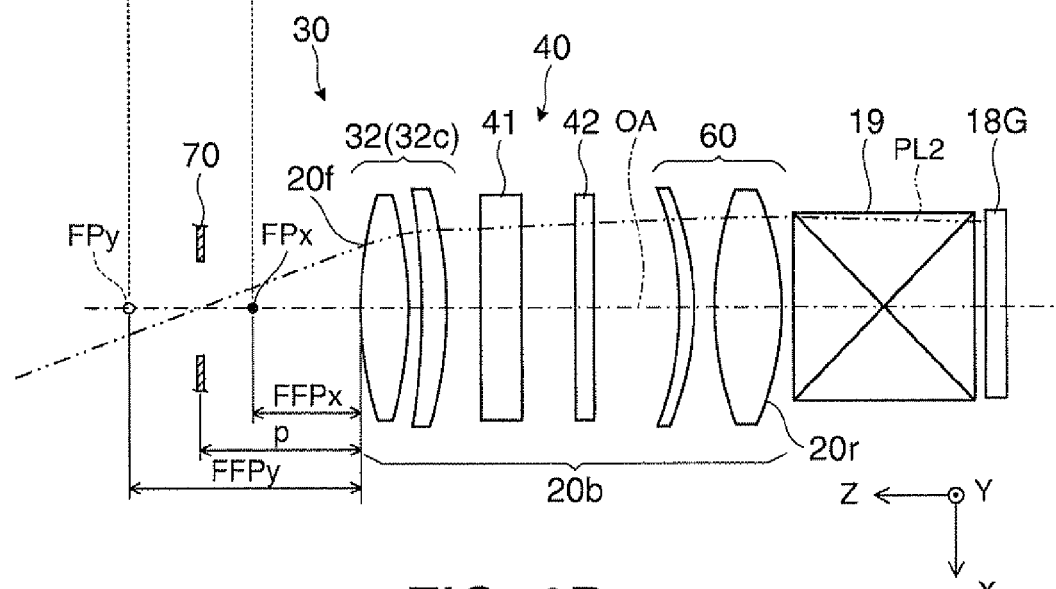

FIGS. 6A and 6B describe the position of the diaphragm 70 in the projection system 20. Consider now an object-side lens group 20b as the portion of the projection system 20 that affects object-side telecentricity disposed between the liquid crystal panel 18G (18R, 18B) and the diaphragm 70. In FIGS. 6A and 6B, the object-side lens group 20b is formed of the third lens group 32c in the second lens portion 32 in the first group 30, the second group 40, and the third group 60. That is, the third lens group 32c in the first group 30, the second group 40, and the third group 60 are disposed on the object side of the diaphragm 70. First, let p be the distance between the diaphragm 70 and an extreme end surface 20f of the object-side lens group 20b on the side where the screen SC is present. In the vertical cross-sectional plane, that is, the YZ cross-sectional plane of the object-side lens group 20b shown in FIG. 6A, let FFPy be the distance between a focal point FPy of the object-side lens group 20b on the side where the screen SC is present and the extreme end surface 20f of the object-side lens group 20b on the side where the screen SC is present. Further, in the horizontal cross-sectional plane, that is, the XZ cross-sectional plane of the object-side lens group 20b shown in FIG. 6B, let FFPx be the distance between a focal point FPx of the object-side lens group 20b on the side where the screen SC is present and the extreme end surface 20f of the object-side lens group 20b on the side where the screen SC is present. In this case, the distance p from the extreme end surface 20f to the diaphragm 70 is set at a value between the distance FFPx and the distance FFPy. That is, when FFPx<FFPy, the distance p is set to fall within the range expressed by the following condition (1):

$$FFPx < p < FFPy \tag{1}$$

When FFPy<FFPx, the distance p is set to fall within the range expressed by the following condition (1)':

$$FFPy < p < FFPx \tag{1'}$$

In the projection system 20 illustrated in FIGS. 6A and 6B, the focal point FPx in the horizontal cross-sectional plane is closer to the extreme end surface 20f than the focal point FPy in the vertical cross-sectional plane or FFPx<FFPy. The projection system 20 therefore has a greater enlarging factor or provides a greater aspect ratio of an image in the horizontal direction than in the vertical direction. In this case, the distance p is set to fall within the range expressed by the condition (1) and greater than the lower limit FFPx but smaller than the upper limit FFPy.

The conditions (1) and (1)' described above define the range where the diaphragm 70 is disposed to maintain satisfactory telecentricity of the projection system 20 in consideration of the viewing angle direction. When the diaphragm 70 is disposed within the range expressed by the condition (1) or (1)', the telecentricity can be increased to ensure sufficient light usage efficiency, whereby the performance of the projector 2 can be increased. For example, when the projection system 20 is designed to compress an image in the vertical direction, FFPx<FFPy is typically satisfied. In this case, in the light flux traveling to an extreme end surface 20r of the object-side lens group 20b on the side where the liquid crystal panel 18G (18R, 18B) is present, light rays corresponding to the greatest viewing angle are not parallel to the optical axis OA but is inclined thereto. Specifically, a principal ray PL1 corresponding to a peripheral portion of an image in the vertical cross-sectional plane is inclined inward toward the screen SC, whereas a principal ray PL2 corresponding to a peripheral portion of the image in the horizontal cross-sectional plane is inclined outward toward the screen SC. As a result, the projection system 20 is not telecentric in an exact sense in the vertical or horizontal direction, but the telecentricity is reasonably increased in both the vertical and horizontal directions in a well balanced manner. When the diaphragm 70 is disposed in a position beyond the upper limit of the condition (1) on the side where the screen SC is present, both the principal rays corresponding to the peripheral portions of the image in the horizontal and vertical cross-sectional planes are inclined outward or in a direction away from the optical axis OA toward the screen SC, resulting in large degradation in telecentricity of the projection system 20. Conversely, when the diaphragm 70 is disposed in a position beyond the lower limit of the condition (1) on the side where the screen SC is present, both the principal rays corresponding to the peripheral portions of the image in the horizontal and vertical cross-sectional planes are inclined inward or in a direction approaching the optical axis OA toward the screen SC, resulting in large degradation in telecentricity of the projection system 20.

A more preferable position of the diaphragm 70 is within the range from the middle position between the focal point FPy of the object-side lens group 20b in the vertical cross-sectional plane and the focal point FPx of the object-side lens group 20b in the horizontal cross-sectional plane to the focal position on the side where the extreme end surface 20f is present or the object side. That is, when FFPx<FFPy, the distance p is set to fall within the range expressed by the following condition (2):

$$FFPx < p \leq (FFPy+FFPx)/2 \tag{2}$$

When FFPy<FFPx, the distance p is set to fall within the range expressed by the following condition (2)':

$$FFPy < p \leq (FFPy+FFPx)/2 \tag{2'}$$

The projection system 20 illustrated in FIGS. 6A and 6B, in which FFPx<FFPy is satisfied, has a greater enlarging factor or provides a greater aspect ratio of an image in the horizontal direction than in the vertical direction. In this case, the distance p is set to fall within the range expressed by the following condition (2) and greater than the lower limit FFPx but smaller than or equal to the upper limit (FFPy+FFPx)/2, whereby the telecentricity in intermediate directions between the horizontal direction and the vertical direction can be relatively increased and directional variation in telecentricity can be reduced. As a result, a bright image that unlikely suffers from unevenness depending on the viewing direction and other factors can be projected.

Figure 7A:
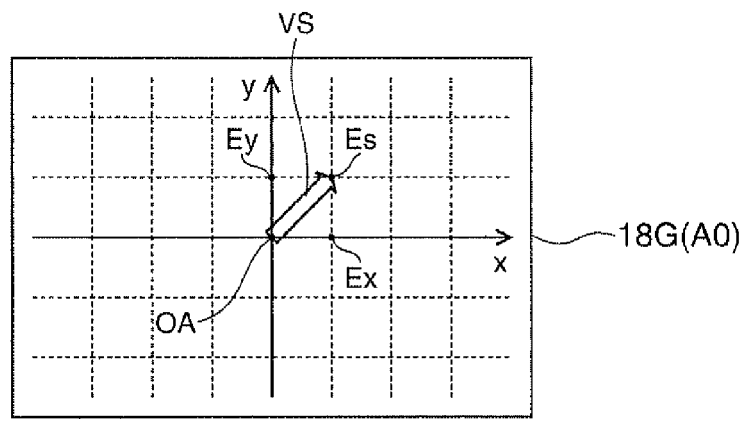
FIG. 7A describes positions in a display area of a liquid crystal panel.

Consider the coordinates of the display area A0 of the liquid crystal panel 18G with reference to FIG. 7A. In the following description, an x axis and a y axis are so defined with respect to the optical axis OA that the x axis corresponds to the horizontal X direction and the y axis corresponds to the vertical Y direction. In the projection system 20 including a vertically and horizontally asymmetric anamorphic lens system, the present inventor has found that considering the angles of the principal rays that exit from the liquid crystal panel 18G only in horizontal axis positions along the x axis and vertical axis positions along the y axis is not enough but considering the exiting angles in positions along an oblique direction is also necessary. That is, the exiting angle of the principal ray (principal ray angle) in the direction indicated by an oblique vector VS in FIG. 7A is considered. It is assumed that a horizontal axis position Ex along the x axis and the angle of the principal ray from the position EX are substantially linear relationship in an approximate sense, and that a vertical axis position Ey along the y axis and the angle of the principal ray from the position Ey are substantially linear in an approximate sense. Similarly, an oblique position Es parallel to the vector VS and the angle of the principal ray from the position Es can also be considered as being substantially linear relationship.

Figure 7B:
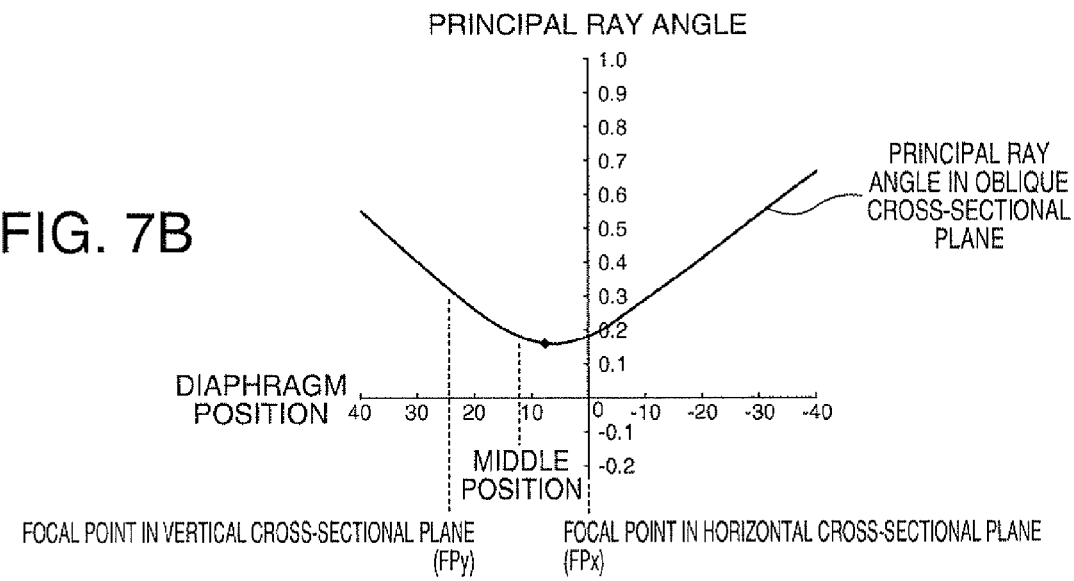
FIG. 7B shows a principal ray angle in an oblique cross-sectional plane of the liquid crystal panel versus the position of the diaphragm.

FIG. 7B shows a simulation result of calculated principal ray angles in the oblique position Es at the front end of the vector VS versus the position of the diaphragm 70.

As clearly shown in the chart, a local minimum of the principal ray angle is present between the focal point FPy of the object-side lens group 20b in the vertical cross-sectional plane and the focal point FPx of the object-side lens group 20b in the horizontal cross-sectional plane. That is, the chart shows that when the diaphragm 70 is positioned between the focal point FPy in the vertical cross-sectional plane and the focal point FPx in the horizontal cross-sectional plane, the increase in the principal ray angle can be suppressed as a whole. In other words, the distance p from the extreme end surface 20f of the object-side lens group 20b to the diaphragm 70 is desirably set a value between the distance FFPx and the distance FFPy. That is, the distance p is desirably set to fall within the range expressed by the condition (1) described above.

When observed in more detail, the local minimum of the principal ray angle is present between the focal point FPx in the horizontal cross-sectional plane and the middle point between the focal point FPy in the vertical cross-sectional plane and the focal point FPx in the horizontal cross-sectional plane. That is, it is believed that when the position of the diaphragm 70 is set in a position between the focal point FPx in the horizontal cross-sectional plane and the middle position between a pair of focal points FPy and FPx, the increase in the principal ray angle can be suppressed as a whole. In other words, the distance p from the extreme end surface 20f of the object-side lens group 20b to the diaphragm 70 is desirably set at a value smaller than or equal to the average of the distance FFPx and the distance FFPy but greater than or equal to the distance FFPx. That is, the distance p is desirably set to fall within the range expressed by the condition (2) described above.

Figure 7C:
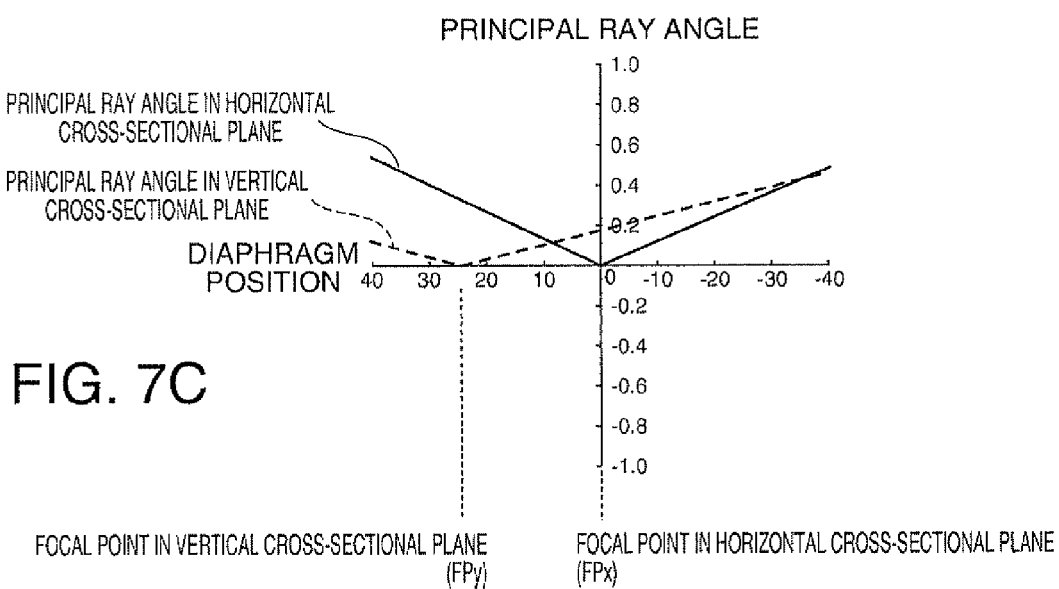
FIG. 7C shows the principal ray angles in the vertical and horizontal cross-sectional planes of the liquid crystal panel versus the position of the diaphragm.

FIG. 7C shows a simulation result of calculated principal ray angles in the position Ex along the horizontal x axis and the position Ey along the horizontal y axis versus the position of the diaphragm 70. As clearly shown in the chart, the principal ray angle in the horizontal axis position Ex is zero when the diaphragm 70 is disposed at the focal point FPx in the horizontal cross-sectional plane. On the other hand, the principal ray angle in the vertical axis position Ey is also zero when the diaphragm 70 is disposed at the focal point FPy in the vertical cross-sectional plane.

As described above, the projection system 20 according to the present embodiment is substantially telecentric on the object side in consideration of the viewing angle direction. That is, the light rays from the liquid crystal panel 18G (18R, 18B) are almost parallel to the optical axis OA in the vertical cross-sectional plane, the horizontal cross-sectional plane, and the oblique cross-sectional plane. The liquid crystal panel 18G (18R, 18B) can therefore be relatively readily combined with the projection system 20 with high precision, whereby the assembly can be performed in a satisfactory manner. Further, in tilt projection in which the projection system 20 is moved in the direction perpendicular to the optical axis OA, when the light rays having exited from the liquid crystal panel 18G (18R, 18B) enter the projection system 20 in a substantially telecentric manner, a sufficient amount of light is readily provided at the periphery of an image, which contributes to improvement in image quality. The substantially telecentric state leads to further improvement in image quality because color unevenness can be reduced.

In the second operation mode, in which the second group 40 in the projection system 20 is removed out of the optical path as shown in FIG. 5B, no component is disposed in the position of the second group 40 in the projection system 20. That is, when the second group 40 is not disposed in the projection system 20, the first group 30 and the third group 60, which are formed only of rotationally symmetric optical elements, cooperates with each other. In this case, the aspect ratio of the display area A0 of the liquid crystal panel 18G (18R, 18B) agrees with the aspect ratio of the display area A2 of the screen SC. When the second group 40 is not disposed, the transmittance is improved and the brightness of an image increases accordingly. In the projection system 20 according to the present embodiment, the first group 30 and the third group 60 are fixed along the optical path, and the second group 40 is moved forward or backward along the optical path. This is what greatly differs from a case where a rear-mounted relay system of related art (see JP-A-2005-221597 (Japanese Patent Application No. 2004-027496)) is used as a projection system. That is, in the rear-mounted relay system of the related art, when the rear-mounted relay system is removed, a projection system approaches an imaging device approximately by the length corresponding to the rear-mounted relay system. On the other hand, in the projection system 20 according to the present embodiment, when the second group 40 is removed out of the optical path, it is substantially unnecessary to change the position of the first group 30 or the third group 60. That is, it is unnecessary to move the first group 30 or the third group 60 by a long distance when the vertical and horizontal magnification factors are changed by moving the second group 40 forward or backward along the optical path, whereby burdens on the mechanical mechanisms can be reduced. When the rear-mounted relay system of the related art is used as a projection system, the vertical and horizontal magnification factors can be changed by moving a second group that is part of the rear-mounted relay system forward or backward along the optical path, and the rear-mounted relay system is so designed that moving the second group for changing the vertical and horizontal magnification factors forward or backward along the optical path does not cause a main optical system to move by a long distance. Further, the main optical system, which can be used alone, is not fixed to a mount for the main optical system, but the rear-mounted relay system of the related art is fixed thereto. The rear-mounted relay system of the related art therefore bears a larger optical burden, disadvantageously resulting in an increase in length of the relay system in the optical axis direction and an increase in the number of lenses that form the relay system. On the other hand, the projection system 20 according to the present embodiment does not require the second group 40 to function as a relay lens but allows the total length of the projection system to be shortened and the number of constituent lenses thereof to be reduced. Further, the projection system 20 according to the present embodiment differs from the rear-mounted relay system of the related art in that the entire second group 40, instead of part thereof, is moved forward or backward independently of the first group 30 and the third group 60. Moving the second group 40 forward or backward or inserting or removing the second group 40 therefore does not greatly affect, for example, the degree of decentering of the first group 30 and the third group 60. Further, the second group 40 can be relatively independently disposed in a mechanical sense. As a result, the projection system 20 may be assembled only in consideration of assembling precision of the second group 40 as a single unit in the space between the first group 30 and the third group 60, which are separate from the second group 40, and improvement in assembling workability can therefore be expected.

In the projection system 20, the optical axis OA of the body portion 20*a* can be moved by an appropriate amount of shift SF with the optical axis OA kept parallel to the central axis AX of the liquid crystal panel 18G for tilt projection, which readily prevents a viewer from interfering with the image light PL and improves the installability of the projector. When the body portion 20*a* of the projection system 20 is shifted with respect to the liquid crystal panel 18G as described above, and the zoom drive mechanism 61 is used to operate the second lens portion 32 to perform zooming, in which the projection magnification is changed, the absolute amount of shift of the image light PL increases. The increase in the amount of shift caused by the zooming can be corrected by operating the total system drive mechanism 64, whereby the operability and installability of the projector 2 can be improved. In this process, the operability can be improved by a greater amount by automating the synchronized operation of the zoom drive mechanism 61 and the total system drive mechanism 64 under the control of the main controller 88.

In the projection system 20 according to the present embodiment, one or both of the surfaces of each of the optical element groups 41 and 42, which are optical elements for adjustment that form the second group 40, are cylindrical lens surfaces. A cylindrical lens is relatively more readily manufactured than an anamorphic lens, a free-form surface lens, and other similar lenses, and greater precision is expected in a less expensive manner. Further, the planar cross-sectional plane side of each of the optical element groups 41 and 42 has lower sensitivity to decentering, whereby the assembly can be performed in a more satisfactory manner and hence higher performance can be expected. That is, the second group 40 formed of cylindrical lenses allows cost reduction with the precision of the projection system 20 maintained.

One or both of the surfaces of each of the optical element groups 41 and 42, which form the second group 40, are not limited to cylindrical lens surfaces but can be anamorphic lens surfaces (toric or toroidal lens surfaces, for example).

In the above description, one or both of the surfaces of each of the cylindrical or anamorphic optical element groups 41 and 42, which form the second group 40, can be shaped in accordance with an aspheric expression, specifically, the following polynomial h in the vertical X cross-sectional plane or the horizontal Y cross-sectional plane.

$$h = \frac{cy^2}{1 + \sqrt{1 - (1+k)c^2 y^2}} + A_2 y^2 + A_4 y^4 + A_6 y^6 + A_8 y^8 + A_{10} y^{10} + \ldots$$

In the expression, y represents the height of an image measured from the optical axis OA (image height), c represents the curvature of a reference spherical surface, k represents a conic constant, and $A_2$, $A_4$, $A_6$, $A_8$, $A_{10}$, ... represent predetermined correction terms.

Further, one or both of the surfaces of each of the optical element groups 41 and 42, which form the second group 40, can alternatively be free-form surfaces. Since the curvature of each of the cross-sectional planes in the Y and X directions can be controlled by using a free-form surface lens, the amount of astigmatism can be reduced and hence higher performance is achieved. Further, using an aspheric surface allows the amount of a variety of aberrations to be reduced and hence higher performance to be achieved. Moreover, using a free-form surface readily allows optimization of image formation in each oblique direction between the vertical and horizontal directions of the liquid crystal panel 18G (18R, 18B) on an image circle surface of the screen SC or the liquid crystal panel 18G (18R, 18B), and hence higher performance to be achieved.

The second group 40 is not necessarily formed of the two optical element groups 41 and 42 but can be formed of three or more optical element groups. In this case, it is desirable that the second group 40 produces no chromatic aberrations. To this end, the following relationship is desirably satisfied:

$$\Sigma(\phi i \times \nu i) \approx 0.$$

In the expression, $\phi i$ represents the refractive index of each lens that forms the second group 40, and $\nu i$ represents the Abbe number of each lens that forms the second group 40.

Figure 8A:
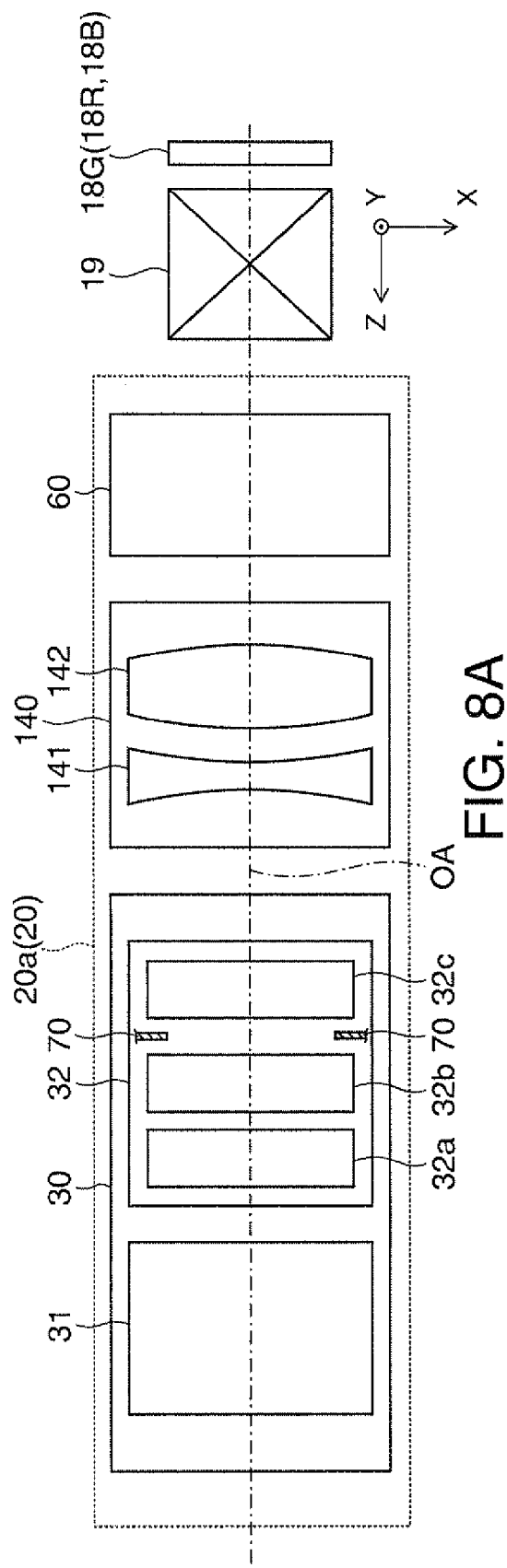
FIG. 8A shows the configuration of a variation of the projection system shown in FIGS. 4A and 4B and other figures in the horizontal cross-sectional plane.
Figure 8B:
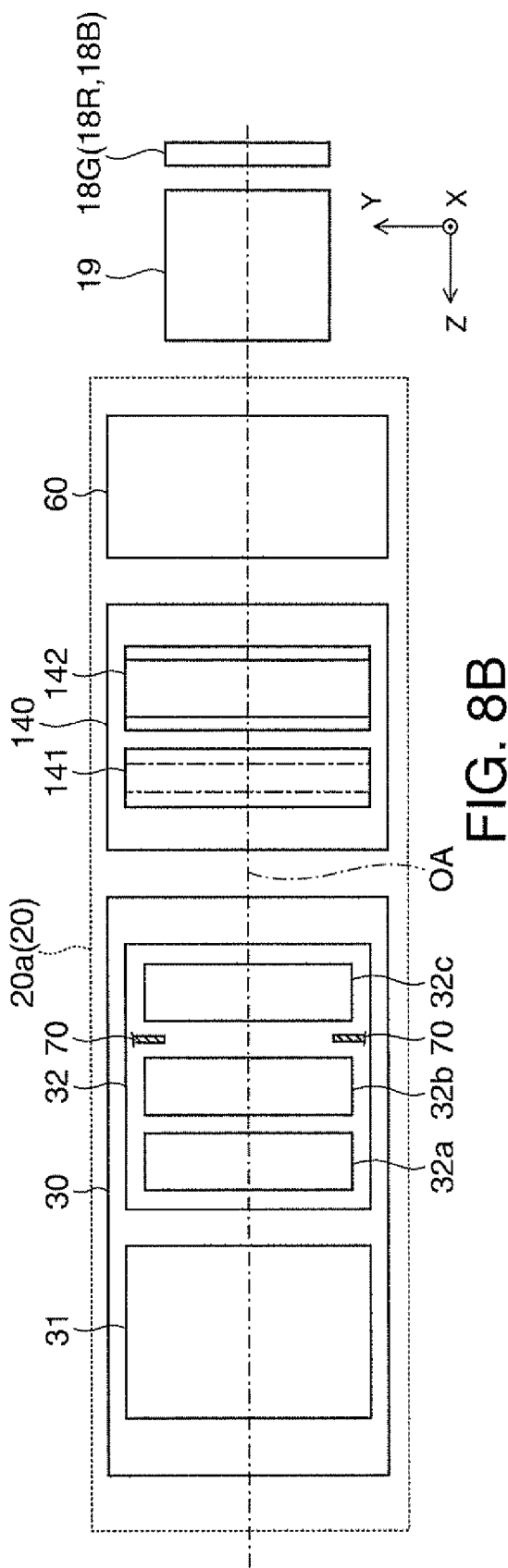
FIG. 8B shows the configuration of the variation of the projection system in the vertical cross-sectional plane.

FIGS. 8A and 8B describe a variation of the projection system 20 shown in FIGS. 4A and 4B. A second group 140 has different focal lengths between the vertical direction (Y direction) and the horizontal direction (X direction). As a result, the entire projection system 20 including the first group 30 has different focal lengths between the vertical direction and the horizontal direction. In this case, the second group 140 is formed of a first optical element group 141 having negative power and a second optical element group 142 having positive power arranged in this order from the side where the screen SC is present, and the positive and negative power is present in the cross-sectional plane in the horizontal direction (X direction). When the second group 140 is removed from the optical path, an image formed on the liquid crystal panel 18G (18R, 18B) can be projected as it is on the screen SC by using the same aspect ratio (1.78:1, for example). When the second group 140 is inserted in the optical path as shown in FIG. 8A and other figures, an image formed on the liquid crystal panel 18G (18R, 18B) can be expanded in the horizontal direction by using a desired aspect ratio (2.4:1, for example) and projected on the screen SC. Moreover, the aspect ratio of an image projected on the screen SC can be continuously increased or decreased by using the second anamorphic drive mechanism 63 shown in FIG. 3 to move the first optical element group 141 and the second optical element group 142, which form the second group 140, along the optical axis OA and adjusting the distance between the first optical element group 141 and the second optical element group 142. The configuration in which an image projected by the second group 40 on the screen SC is expanded in the horizontal direction is effective when the screen SC has a fixed vertical dimension. That is, when the screen SC has a fixed vertical dimension, only the aspect ratio can be changed with the projection distance and other parameters of the projection system 20 unchanged.

According to the projection system 20 of the present embodiment described above, since the object-side lens group 20*b* has different power factors between the vertical and horizontal directions of the liquid crystal panel 18G (18R, 18B), the total projection system 20 has different focal lengths between the vertical and horizontal directions and hence different magnification factors between the vertical and horizontal directions, and the aspect ratio of an image on the liquid crystal panel 18G (18R, 18B) can be set at a value different from the aspect ratio of an image projected on the screen SC. That is, the projection system 20 according to the present embodiment allows the aspect ratio, which is the ratio of the width to the height of an image, to be changed. Since the distance p between the diaphragm 70 and the extreme end surface 20f of the object-side lens group 20b on the side where the screen SC is present satisfies the condition (1) or (1)' described above, at least a certain degree of telecentricity can be provided in both the vertical and horizontal directions.

Example 1

Figure 9:
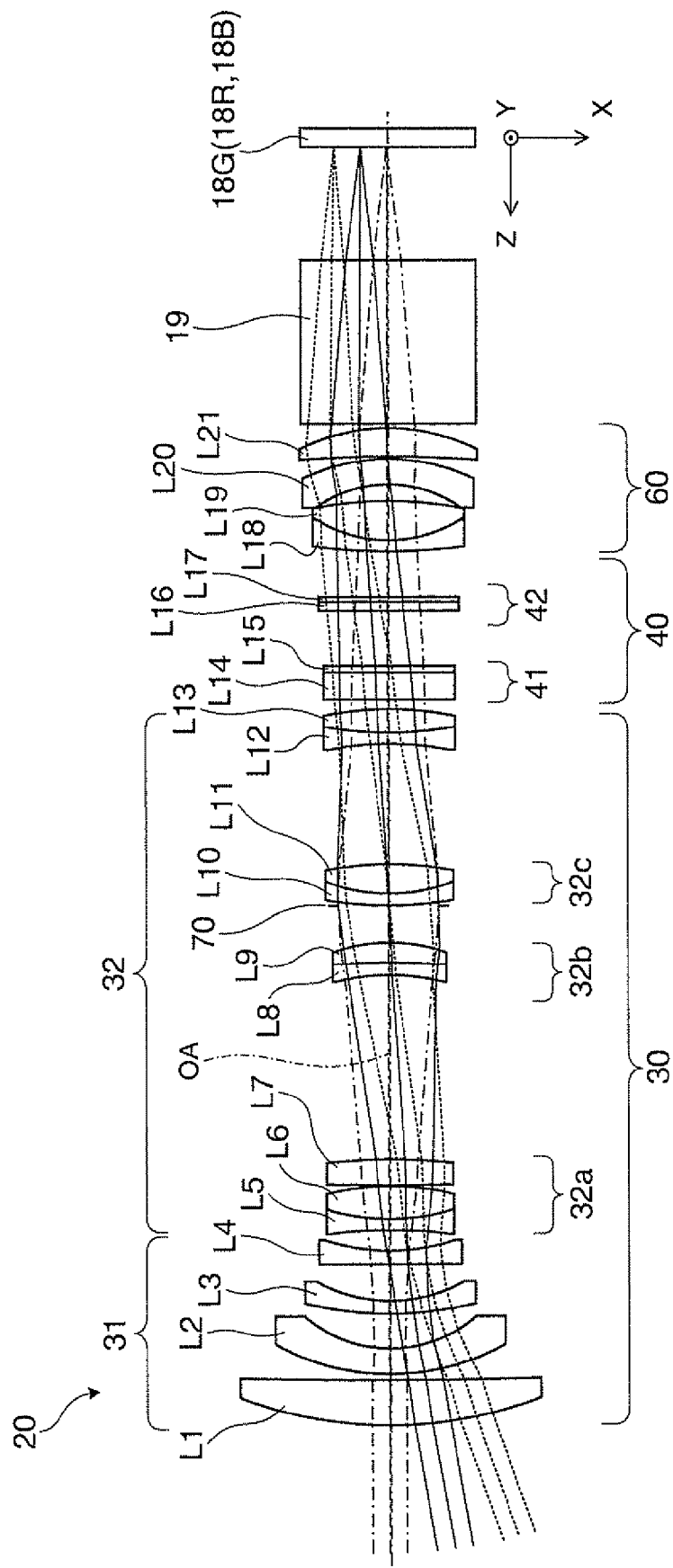
FIG. 9 describes the horizontal cross-sectional plane of an optical system according to Example 1 of the first embodiment.
Figure 10:
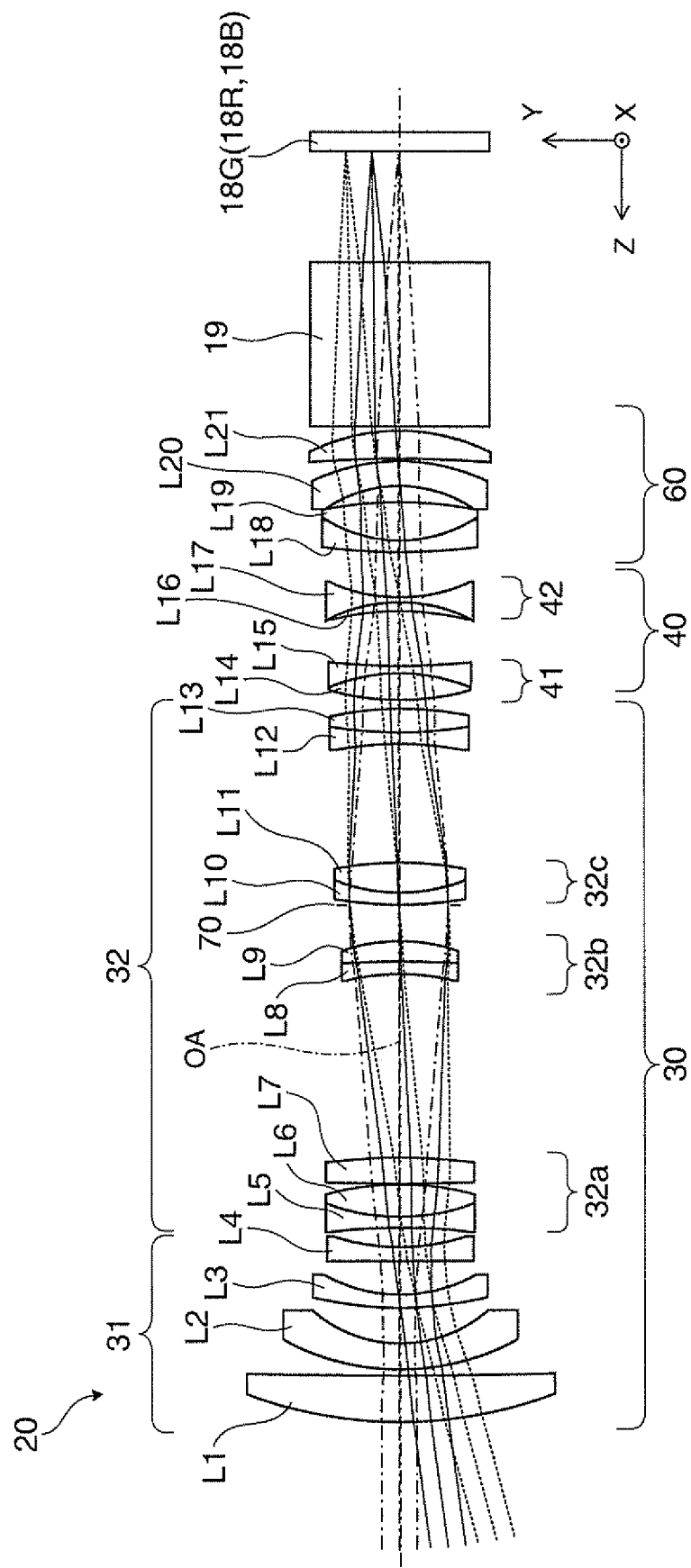
FIG. 10 describes the vertical cross-sectional plane of the optical system according to Example 1.

FIGS. 9 and 10 describe Example 1, which is a specific example of the projection system 20 according to the first embodiment. FIG. 9 is a horizontal cross-sectional view, and FIG. 10 is a vertical cross-sectional view. In this case, the state of the projection system 20 is a "telescopic end" state in which the enlarging factor is relatively small. Further, the projection system 20 shown in FIGS. 9 and 10 operates in the first operation state, in which the second group 40 is inserted in the optical path so that the aspect ratio of an image is compressed in the vertical Y direction.

The projection system 20 is formed of lenses L1 to L21, the lenses L1 to L13 forming the first group 30, the lenses L14 to L17 forming the second group 40, and the lenses L18 to L21 forming the third group 60. Each of the lenses L1 to L13, which form the first group 30, is a spherical lens rotationally symmetric with respect to the optical axis OA. The lenses L14 and L15 in the second group 40 form a doublet having positive power in the vertical Y direction and is a cylindrical lens having no power in the horizontal X direction. The lenses L16 and L17 in the second group 40 form a doublet having negative power in the vertical Y direction and is a cylindrical lens having no power in the horizontal X direction. Each of the lenses L18 to L21, which form the third group 60, is a spherical lens rotationally symmetric with respect to the optical axis OA. The lenses L18 and L19 form a doublet that is a combination of a negative lens and a positive lens. The lens L20 is a negative meniscus lens, and the lens L21 is a positive meniscus lens. In the first group 30, the first lens group 32a formed of the lenses L5, L6, and L7, the second lens group 32b formed of the lenses L8 and L9, and the third lens group 32c formed of the lenses L10 and L11 are displaced along the optical axis OA when the projection magnification is changed, that is, at the time of zooming.

The following Table 1 shows lens data and other parameters in Example 1. In the upper fields of Table 1, "surface number" is a number with which a surface of each lens is labeled successively from the surface on the image plane side. "R1" and "R2" represent the radius of curvature in the Y and X directions, respectively. "D" represents the thickness of a lens or air separation between the surface in question and the following surface. "Nd" represents the refractive index of a lens material at the d line. "vd" represents the Abbe number of a lens material at the d line. In Example 1, any one of the surfaces is a spherical surface or a cylindrical surface.

TABLE 1

| Surface number | R1 | R2 | D | Nd | vd |
| --- | --- | --- | --- | --- | --- |
| 1 | 88.841 | | 9.85 | 1.533498 | 73.348 |
| 2 | 708.771 | | 1.38 | | |

TABLE 1-continued

| Surface number | R1 | R2 | D | Nd | vd |
| --- | --- | --- | --- | --- | --- |
| 3 | 50.381 | | 5.54 | 1.834807 | 42.7137 |
| 4 | 27.432 | | 7.70 | | |
| 5 | 73.014 | | 2.81 | 1.714084 | 53.1945 |
| 6 | 31.515 | | 7.94 | | |
| 7 | 564.765 | | 3.02 | 1.697403 | 55.4447 |
| 8 | 41.483 | | variable | | |
| 9 | −124.147 | | 2.50 | 1.799972 | 44.9972 |
| 10 | 45.064 | | 7.04 | 1.660553 | 33.1951 |
| 11 | −63.330 | | 0.20 | | |
| 12 | 372.446 | | 5.70 | 1.685991 | 31.1162 |
| 13 | −131.915 | | variable | | |
| 14 | −46.961 | | 2.65 | 1.813225 | 44.077 |
| 15 | −189.952 | | 4.28 | 1.682055 | 41.6135 |
| 16 | −37.302 | | 3.83 | | |
| diaphragm | 0.000 | | variable | | |
| 18 | 77.170 | | 2.50 | 1.820557 | 35.2023 |
| 19 | 34.783 | | 6.44 | 1.631250 | 60.5188 |
| 20 | −76.077 | | 0.12 | | |
| 21 | −69.578 | | 2.50 | 1.810850 | 37.4065 |
| 22 | 82.612 | | 5.06 | 1.605659 | 63.0624 |
| 23 | −73.663 | | 2.10 | | |
| 24 | 53.500 | ∞ | 5.85 | 1.834807 | 42.7137 |
| 25 | −41.089 | ∞ | 1.60 | 1.763554 | 29.3591 |
| 26 | 119.745 | ∞ | 12.04 | | |
| 27 | −63.044 | ∞ | 1.89 | 1.721355 | 28.8186 |
| 28 | −35.880 | ∞ | 1.10 | 1.496999 | 81.5459 |
| 29 | 35.535 | ∞ | 10.00 | | |
| 30 | 118.253 | | 2.50 | 1.719018 | 52.5823 |
| 31 | 29.302 | | 8.58 | 1.496999 | 81.5459 |
| 32 | −84.104 | | 3.56 | | |
| 33 | −27.430 | | 5.55 | 1.730300 | 30.0889 |
| 34 | −43.080 | | 0.51 | | |
| 35 | −256.893 | | 6.18 | 1.807655 | 44.4554 |
| 36 | −43.079 | | 1.00 | | |
| 37 | 0.000 | | 36.00 | 1.516330 | 64.142 |
| 38 | 0.000 | | 13.95 | | |
| 39 | 0.000 | | 0.00 | | |

Figure 11:
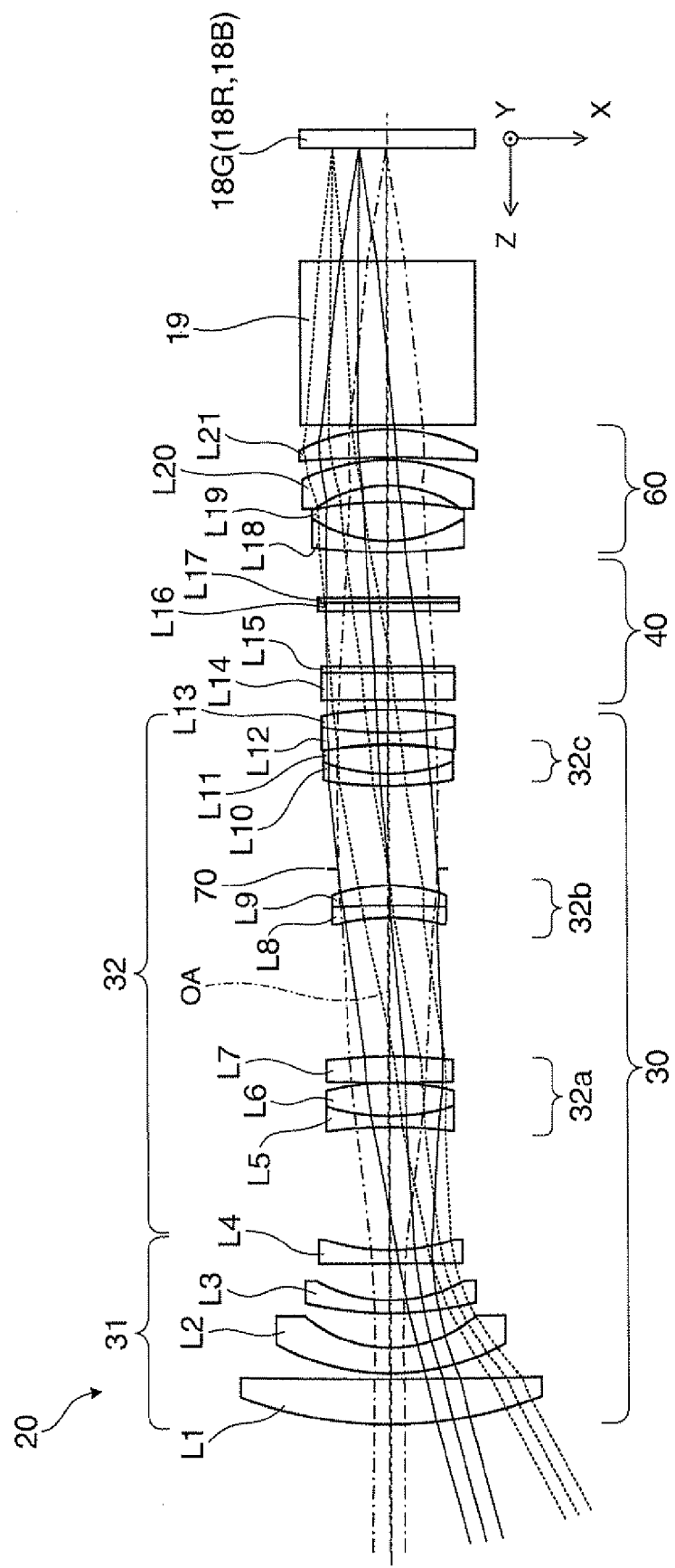
FIG. 11 describes the horizontal cross-sectional plane of the optical system shown in FIG. 9 in a wide end state.
Figure 12:
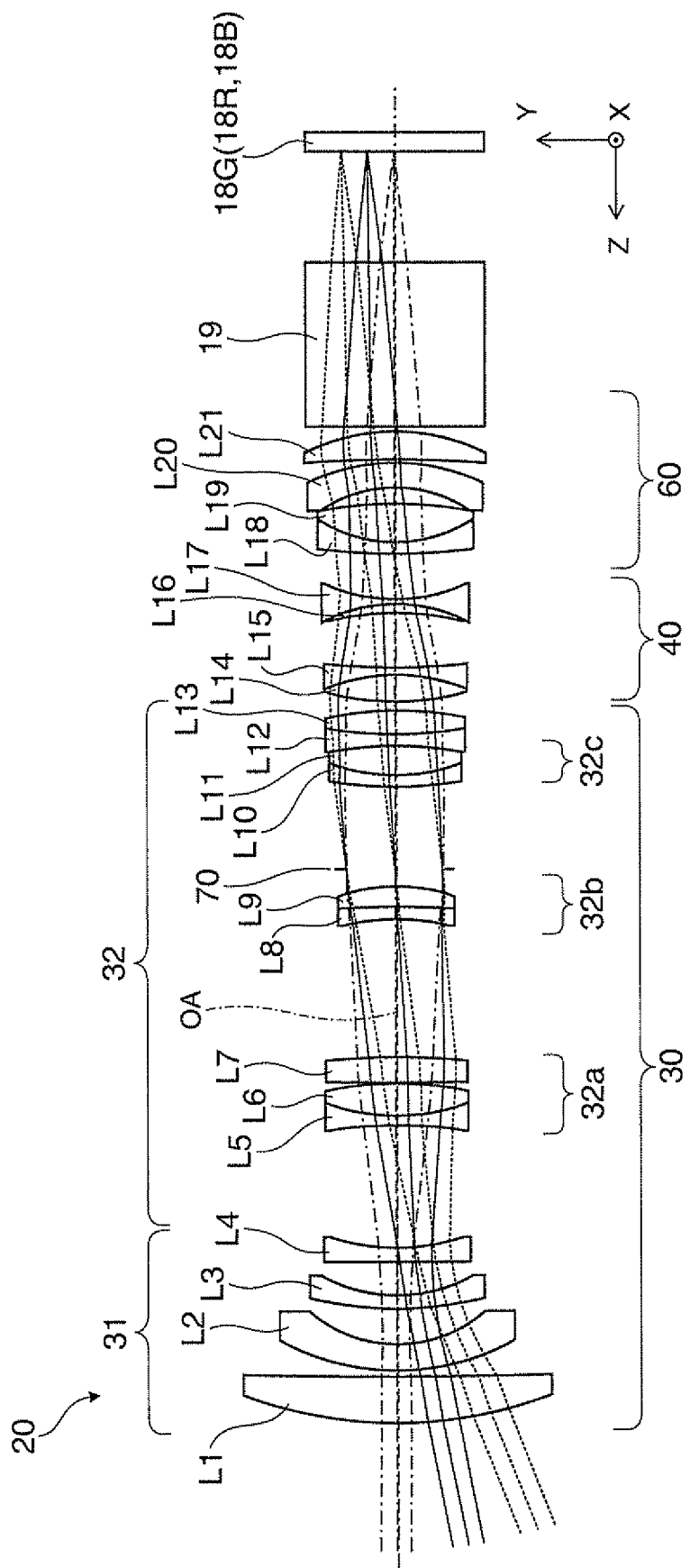
FIG. 12 describes the vertical cross-sectional plane of the optical system shown in FIG. 10 in the wide end state.

FIGS. 11 and 12, which correspond to FIGS. 9 and 10 respectively, show a "wide end" state. Zooming operation is performed by individually moving the lens groups 32a, 32b, and 32c in the second lens portion 32 along the optical axis OA, as shown in FIGS. 11 and 12.

Figure 13A:
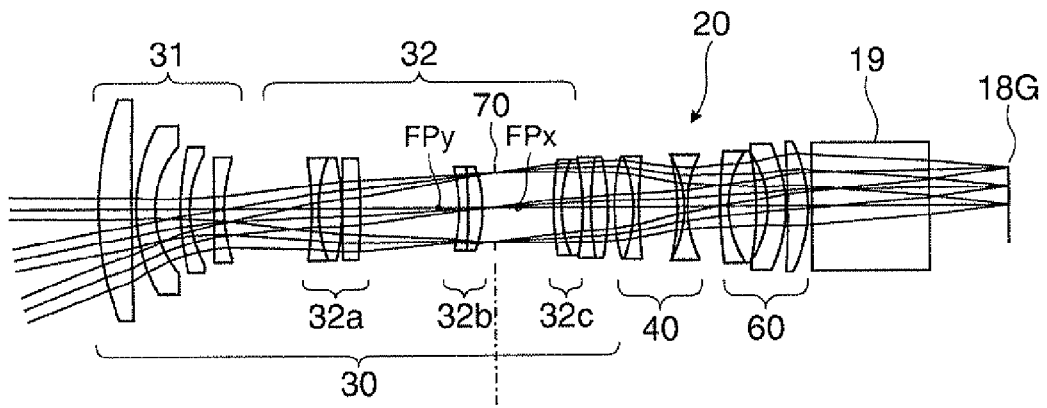
FIGS. 13A to 13C describe optical zooming operation performed in Example 1.
Figure 13B:
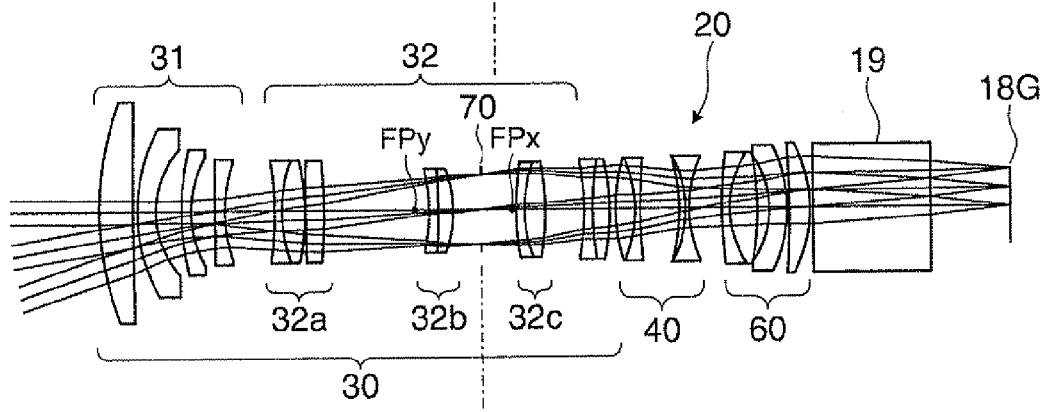
Figure 13C:
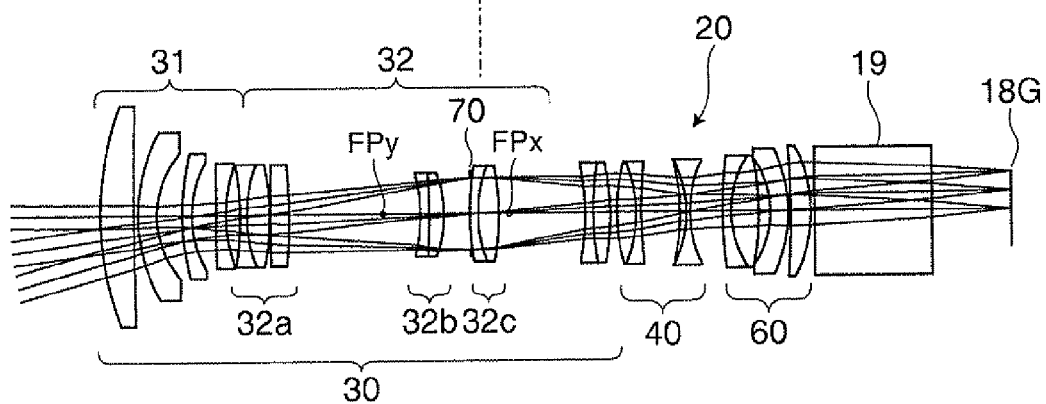

FIGS. 13A to 13C describe the zooming operation. FIG. 13A shows the state in FIG. 12, which is the "wide end" state in which the enlarging factor is large. FIG. 13B shows an "intermediate" state, and FIG. 13C shows the state in FIG. 10, which is the "telescopic end" state in which the enlarging factor is small. The position of the diaphragm 70 changes as the zooming operation is performed, as shown in FIGS. 13A to 13C. It is, however, noted that the diaphragm 70 is located between the focal point FPy in the vertical cross-sectional plane and the focal point FPx in the horizontal cross-sectional plane, specifically, in a position closer to an object, that is, the focal point FPx away from the middle position between the focal point FPy in the vertical cross-sectional plane and the focal point FPx in the horizontal cross-sectional plane.

The upper portion of the following Table 2 shows the positions of the lens groups 32a, and 32b in the second lens portion 32 and the diaphragm 70 at the time of zooming operation shown in FIGS. 13A to 13C. Specifically, an eighth surface is the image-side surface of the lens L5 in the lens group 32a, and a thirteenth surface is the image-side surface of the lens L8 in the lens group 32b.

TABLE 2

| | Wide | Middle | Telescopic |
| --- | --- | --- | --- |
| 8 | 27.151 | 15.018 | 4.390 |
| 13 | 30.302 | 32.652 | 40.498 |
| diaphragm | 18.215 | 11.062 | 0.100 |

TABLE 2-continued

|  | Wide | Middle | Telescopic |
|---|---|---|---|
| fx | 21.348 | 26.128 | 31.973 |
| fy | 28.094 | 34.385 | 42.057 |
| Fx | 3.10 | 3.59 | 4.09 |
| Fy | 4.09 | 4.72 | 5.39 |

The middle portion of Table 2 shows the focal lengths of the projection system 20 in the X and Y directions at the time of the zooming operation. The lower portion of Table 2 shows brightness (F number) of the projection system 20 in the X and Y directions at the time of the zooming operation.

Figure 14A:
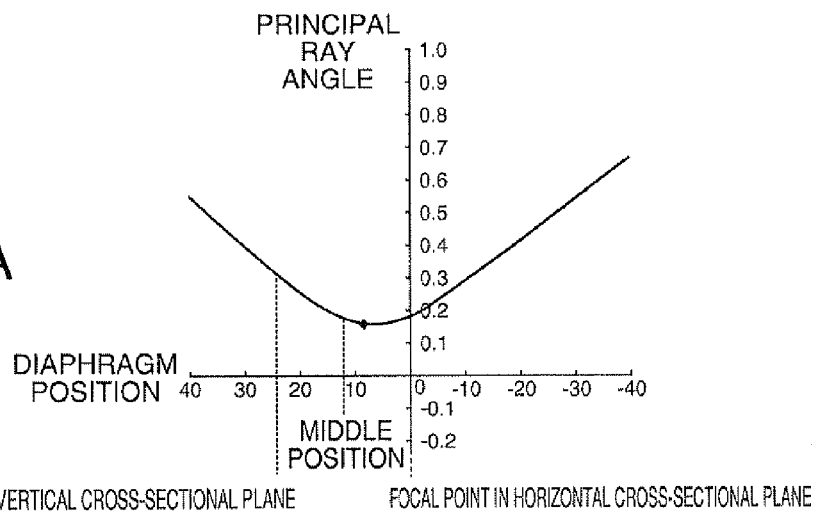
FIGS. 14A to 14C show principal ray angles in an oblique direction during the zooming operation.
Figure 14B:
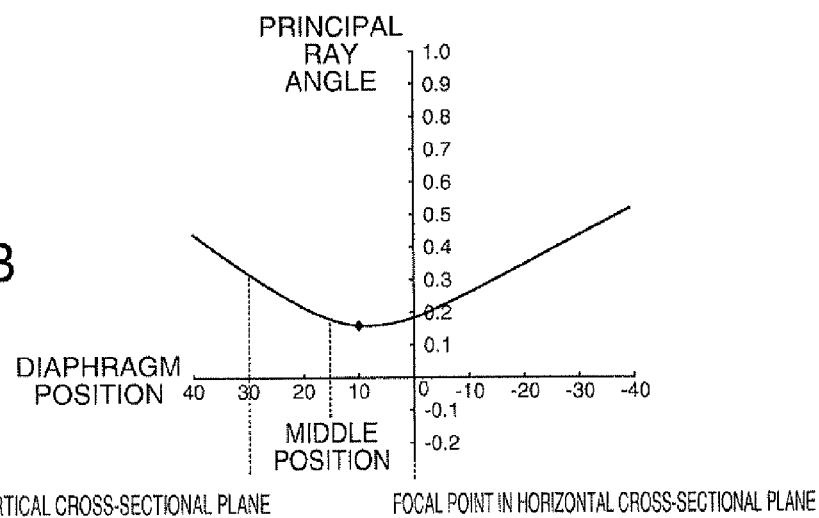
Figure 14C:
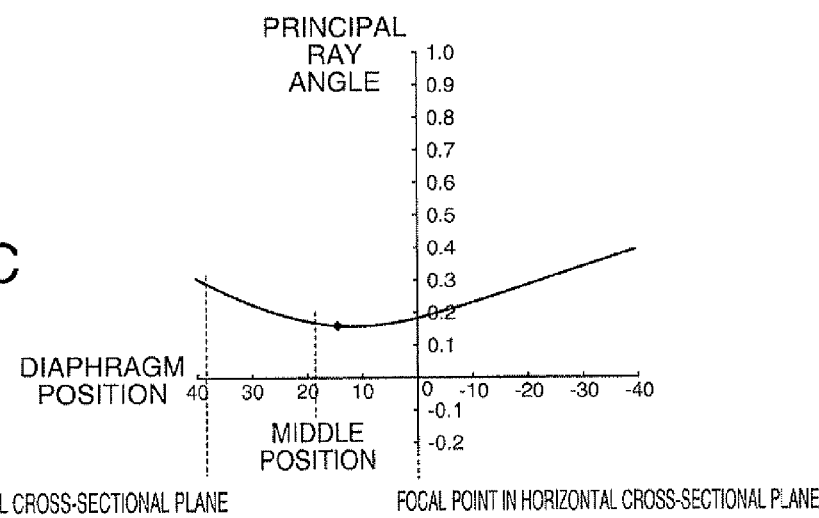

FIGS. 14A to 14C show simulation results of calculated principal ray angles in an oblique direction versus the position of the diaphragm 70 during the zooming operation. FIG. 14A corresponds to FIG. 13A showing the "wide end" state. FIG. 14B corresponds to FIG. 13B showing the "intermediate" state. FIG. 14C corresponds to FIG. 13C showing the "telescopic end" state.

Second Embodiment

A projection system and other components according to a second embodiment will be described below. The present embodiment is a variation of the projection system and other components according to the first embodiment, and portions or items of the second embodiment that are not particularly described below are the same as those in the first embodiment.

FIGS. 15A and 15B describe a projection system 20 according to the second embodiment. A second group 240 in the projection system 20 is formed of a first optical element group 241 having negative power and a second optical element group 242 having positive power arranged in this order from the side where the screen SC is present, and the positive and negative power is present in the cross-sectional plane in the vertical direction (Y direction). In this case, images formed on the liquid crystal panel 18G (18R, 18B) can be expanded in the vertical direction by using a desired aspect ratio, and the resultant video images can be projected on the screen SC.

In the projection system 20 shown in FIG. 15A and other figures, in general, the focal point FPy in the vertical cross-sectional plane is closer to the liquid crystal panel 18G (18R, 18B) than the focal point FPx in the horizontal cross-sectional plane or FFPy<FFPx. In this case, the distance p is set to fall within the range expressed by the condition (1)':

$$FFPy < p < FFPx \qquad (1)'$$

The distance p is greater than the lower limit FFPy but smaller than the upper limit FFPx, whereby the telecentricity can be increased in both the horizontal and vertical directions.

In the projection system 20 shown in FIG. 15A and other figures, the distance p is further set to fall within the range expressed by the condition (2)':

$$FFPy < p \leq (FFPy+FFPx)/2 \qquad (2)'.$$

The distance p is greater than the lower limit FFPy but smaller than or equal to the upper limit (FFPy+FFPx)/2, whereby the telecentricity in intermediate directions between the horizontal and vertical directions can be relatively increased.

Third Embodiment

A projection system and other components according to a third embodiment will be described below. The present embodiment is a variation of the projection system and other components according to the first embodiment, and portions or items of the third embodiment that are not particularly described below are the same as those in the first embodiment.

FIGS. 16A and 16B describe a projection system 320 according to the third embodiment. The projection system 320 is formed of a first group 30 and a second group 40 but includes no third group 60 unlike the projection system 20 according to the first embodiment. In this case, the diaphragm 70 is positioned between the focal point in the horizontal cross-sectional plane and the focal point in the vertical cross-sectional plane with respect to an extreme end surface of an object-side lens group 20b on the side where the screen SC is present, and the distance p from the extreme end surface of the object-side lens group 20b on the side where the screen SC is present to the diaphragm 70 is set at a value between the distance FFPy and the distance FFPx. Further, in the projection system 320, the position of the diaphragm 70 is set to fall within the range from the middle position between the focal point of the object-side lens group 20b in the vertical cross-sectional plane and the focal point of the object-side lens group 20b in the horizontal cross-sectional plane to the focal position on the side where the liquid crystal panel 18G (18R, 18B) is present.

The second group 40 shown in FIG. 16A and other figures can be configured in the same manner as the second group 140 shown in FIG. 8A and other figures. Alternatively, the second group 40 shown in FIG. 16A and other figures can be configured in the same manner as the second group 240 shown in FIG. 15A and other figures.

In the projection system 320 according to the third embodiment, a lens group having positive power can be added to the second group 40.

The invention is not limited to the embodiments described above and can be implemented in a variety of aspects to the extent that they do not depart from the substance of the invention.

The second group 40 is not necessarily formed only of the rotationally asymmetric optical element groups 41 and 42, and another asymmetric optical element group can be added to the second group 40.

The liquid crystal panels 18G, 18R, and 18B are not necessarily transmissive but can be reflective. The word "transmissive" used herein means that each of the liquid crystal panels transmits modulated light, and the word "reflective" used herein means that each of the liquid crystal panels reflects modulated light.

The projector 2 described above combines color images formed by the plurality of liquid crystal panels 18G, 18R, and 18B and can alternatively enlarge and project an image formed by a color or monochromatic liquid crystal panel that is a single light modulator through the projection system 20. In this case, the cross dichroic prism 19 is unnecessary, whereby the degree of freedom on optical design of the projection system 20 increases.

Projectors are classified into a front-projection projector that projects an image from the side where a viewer observes a projection surface and a rear-projection projector that projects an image from the side opposite the side where the viewer observes the projection surface. The configuration of the projector shown in FIG. 2 and other figures is applicable to both the types of projector.

Each of the liquid crystal panels 18G, 18R, and 18B used as a light modulator can be replaced, for example, with a digital micromirror device having micromirrors as pixels.

The entire disclosure of Japanese Patent Application No. 2011-138234, filed Jun. 22, 2011 is expressly incorporated by reference herein.

What is claimed is:

1. A projection system that enlarges and projects an image on a projection surface by using different aspect ratios between an image on a light modulator and the image projected on the projection surface, the projection system comprising:
   a diaphragm that limits a light flux passing therethrough,
   wherein an object-side lens group disposed between the light modulator and the diaphragm has different power factors between vertical and horizontal directions of the light modulator, and
   assuming that
      a variable p represents the distance between the diaphragm and an extreme end surface of the object-side lens group on the projection surface side,
      a variable FFPx represents the distance between the focal point of the object-side lens group on the projection surface side and the extreme end surface of the object-side lens group on the projection surface side in a horizontal cross-sectional plane of the object-side lens group, and
      a variable FFPy represents the distance between the focal point of the object-side lens group on the projection surface side and the extreme end surface of the object-side lens group on the projection surface side in a vertical cross-sectional plane of the object-side lens group,
   when FFPx<FFPy, FFPx<p<FFPy, whereas
   when FFPy<FFPx, FFPy<p<FFPx.

2. The projection system according to claim 1,
   when FFPx<FFPy, FFPx<p≤(FFPy+FFPx)/2, whereas
   when FFPy<FFPx, FFPy<p≤(FFPy+FFPx)/2.

3. The projection system according to claim 1,
   comprising a first group for enlargement, a second group having different power factors between the vertical and horizontal directions of the light modulator, and a third group having positive power arranged in this order from the projection surface side.

4. The projection system according to claim 1,
   further comprising a first group for enlargement and a second group having different power factors between the vertical and horizontal directions of the light modulator arranged in this order from the projection surface side.

5. The projection system according to claim 3,
   wherein the second group is retreatably disposed on an optical path, and
   when the second group is not disposed in the optical path, the aspect ratio of the image on the light modulator agrees with the aspect ratio of the image projected on the projection surface.

6. The projection system according to claim 3,
   wherein the first group is a magnification changing optical system, and
   the diaphragm is moved along an optical axis in response to magnification changing operation of the magnification changing optical system.

7. The projection system according to claim 3,
   wherein part or the entire of the second group is each a cylindrical lens, an anamorphic lens, or a free-form surface lens.

8. The projection system according to claim 3,
   wherein the second group includes at least one rotationally symmetric lens and at least one rotationally asymmetric lens.

9. The projection system according to claim 3,
   wherein the second group includes a first optical element group having positive power and a second optical element group having negative power arranged in this order from the projection surface side, the positive and negative power present in the vertical cross-sectional plane of the light modulator.

10. The projection system according to claim 3,
    wherein the second group includes a first optical element group having negative power and a second optical element group having positive power arranged in this order from the projection surface side, the positive and negative power present in the horizontal cross-sectional plane of the light modulator.

11. The projection system according to claim 1,
    wherein the light modulator and the projection system are so disposed that a normal to the light modulator that passes through the center thereof is parallel to the optical axis of the projection system.

12. The projection system according to claim 11,
    further comprising a shift mechanism that moves the optical axis of the projection system with the optical axis kept parallel to the normal passing through the center of the light modulator.

13. The projection system according to claim 1,
    wherein a light combining prism is disposed on the side of the object-side lens group that faces the light modulator.

14. The projection system according to claim 1,
    wherein among light fluxes traveling from the light modulator to an extreme end surface of the object-side lens group on the light modulator side, a principal ray of a light flux corresponding to the greatest viewing angle is not parallel to the optical axis but is inclined thereto.

15. A projector comprising:
    the projection system according to claim 1; and
    a light modulator.

16. A projector comprising:
    the projection system according to claim 2; and
    a light modulator.

17. A projector comprising:
    the projection system according to claim 3; and
    a light modulator.

18. A projector comprising:
    the projection system according to claim 4; and
    a light modulator.

19. A projector comprising:
    the projection system according to claim 5; and
    a light modulator.

20. A projector comprising:
    the projection system according to claim 6; and
    a light modulator.

* * * * *